United States Patent
Aaron et al.

(10) Patent No.: US 10,362,145 B2
(45) Date of Patent: Jul. 23, 2019

(54) SERVER SYSTEM FOR PROVIDING CURRENT DATA AND PAST DATA TO CLIENTS

(71) Applicant: The Boeing Company, Chicago, IL (US)

(72) Inventors: Noah Eric Aaron, Seattle, WA (US); Dave Bennett, Seatac, WA (US); Will R. Cummins, Kent, WA (US); Noah H. Wecker, Seattle, WA (US)

(73) Assignee: The Boeing Company, Chicago, IL (US)

( * ) Notice: Subject to any disclaimer, the term of this patent is extended or adjusted under 35 U.S.C. 154(b) by 91 days.

(21) Appl. No.: 13/935,745

(22) Filed: Jul. 5, 2013

(65) Prior Publication Data
US 2015/0019687 A1 Jan. 15, 2015

(51) Int. Cl.
*H04L 29/06* (2006.01)
*H04L 29/08* (2006.01)

(52) U.S. Cl.
CPC .............. *H04L 67/42* (2013.01); *H04L 67/12* (2013.01)

(58) Field of Classification Search
CPC ....... H04L 67/42; H04L 41/509; H04L 47/70; H04L 67/06; H04L 67/10; H04L 67/16; H04L 67/26; H04L 67/2842; H04L 67/2852; H04L 67/32; H04L 69/03; H04L 41/0813; H04L 41/0823; H04L 41/0869; H04L 41/12; H04L 41/50; H04L 61/1511;
(Continued)

(56) References Cited

U.S. PATENT DOCUMENTS

| 6,233,389 | B1 | 5/2001 | Barton et al. |
| 7,010,538 | B1* | 3/2006 | Black ................ G06F 17/30516 |
| | | | 707/636 |

(Continued)

FOREIGN PATENT DOCUMENTS

| CN | 101026490 A | 8/2007 |
| CN | 101060524 A | 10/2007 |

(Continued)

OTHER PUBLICATIONS

"Concepts and Planning: What is distributed computing," IBM Corporation, last updated Oct. 2005, 3 pages, accessed Jul. 5, 2013. http://publib.boulder.ibm.com/infocenter/txformp/v6r0m0/index.jsp?topic=%2Fcom.ibm.cics.te.doc%2Ferziaz0015.htm.
(Continued)

*Primary Examiner* — William G Trost, IV
*Assistant Examiner* — Ronak Patel
(74) *Attorney, Agent, or Firm* — Yee & Associates, P.C.

(57) ABSTRACT

A method and apparatus for handling a server request received at a data server. The data server comprises a policy request handler. The policy request handler is activated within the data server in response to the server request being received at the data server. The policy request handler is configured to receive a plurality of asynchronous data streams. The policy request handler is further configured to merge data points in the plurality of asynchronous data streams together to form time-ordered data points. The policy request handler is further configured to form policy-based data according to a server policy identified in the server request using the time-ordered data points.

19 Claims, 14 Drawing Sheets

(58) Field of Classification Search
CPC ............... H04L 65/403; H04L 41/0816; H04L
41/0893; H04L 61/1535; H04L 61/6009;
H04L 67/1078; H04L 67/289; H04L
67/104; H04L 65/4084; H04L 41/0803;
H04L 67/34; H04L 69/329; H04L
63/0823; H04L 67/04; H04L 67/1046;
H04L 45/34; H04L 63/0428; H04L
63/104; H04L 67/1042; H04L 67/1044;
H04L 67/1057; H04L 67/1068; H04L
67/107; H04L 67/1093; H04L 67/1095;
H04L 67/1097; H04L 67/24; H04L
41/0876; H04L 45/745; H04L 47/822
USPC ......................................................... 709/219
See application file for complete search history.

(56) References Cited

U.S. PATENT DOCUMENTS

| | | | | |
|---|---|---|---|---|
| 7,043,566 | B1* | 5/2006 | Grant .................. | H04L 67/22 719/318 |
| 2005/0028171 | A1 | 2/2005 | Kougiouris et al. | |
| 2007/0044539 | A1* | 3/2007 | Sabol .................. | G06Q 10/06 73/19.01 |
| 2009/0024722 | A1* | 1/2009 | Sethuraman ........ | H04L 41/0681 709/220 |
| 2009/0138563 | A1* | 5/2009 | Zhu .................... | H04W 4/14 709/206 |
| 2010/0153351 | A1* | 6/2010 | Yung .................. | G06F 17/30377 707/703 |
| 2010/0332401 | A1* | 12/2010 | Prahlad et al. .................. | 705/80 |
| 2012/0144054 | A1 | 6/2012 | Vetzen et al. | |
| 2012/0197852 | A1* | 8/2012 | Dutta .................. | H04L 67/2804 707/692 |
| 2012/0197911 | A1* | 8/2012 | Banka ................. | G06F 17/30864 707/752 |
| 2013/0124613 | A1 | 5/2013 | Plache et al. | |
| 2013/0226320 | A1* | 8/2013 | Berg-Sonne .......... | G05B 15/02 700/90 |
| 2013/0227689 | A1* | 8/2013 | Pietrowicz et al. ............. | 726/23 |
| 2013/0325927 | A1* | 12/2013 | Corbett et al. ................. | 709/203 |
| 2013/0330055 | A1* | 12/2013 | Zimmermann .... | H04N 21/2743 386/240 |
| 2013/0339643 | A1* | 12/2013 | Tekade et al. ................. | 711/162 |
| 2014/0180982 | A1* | 6/2014 | Murphy ................... | G06N 5/04 706/14 |

FOREIGN PATENT DOCUMENTS

| | | |
|---|---|---|
| CN | 101442718 A | 5/2009 |
| CN | 102594860 A | 7/2012 |
| EP | 2592517 A2 | 5/2013 |
| JP | 2002251500 A | 9/2002 |
| JP | 2010198222 A | 9/2010 |

OTHER PUBLICATIONS

Durbin et al., "Understanding Distributed Systems," Oracle Corporation, Oracle7 Server Distributed Systems Manual, vol. 1, Feb. 1996, 22 pages, accessed Jul. 5, 2013. http://docs.oracle.com/cd/A57673_01/DOC/server/doc/SD173/ch1.htm.
Extended European Search Report, dated Dec. 23, 2014, regarding Application No. EP14173991.2, 7 pages.
Canadian Intellectual Property Office Examination Search Report, dated Sep. 1, 2015, regarding Application No. 2,847,788, 4 pages.
Canadian Intellectual Property Office Examination Search Report, dated Jul. 22, 2016, regarding Application No. 2,847,788, 4 pages.
Patent Office of the Cooperation Council for the Arab States of the Gild Examination Report, dated Oct. 10, 2017, regarding Application No. GC2014-27539, 5 pages.
Canadian Intellectual Property Office Office Action, dated Jun. 23, 2017, regarding Application No. 2,847,788, 4 pages.
Chinese Intellectual Property Office Search Report and English Translation, dated May 3, 2018, regarding Application No. 2014103174452, 12 pages.
Japanese Patent Office Notice of Reasons for Rejection and English translation, dated Feb. 27, 2018, regarding Application No. 2014-093182, 6 pages.
Extended European Search Report, dated Feb. 12, 2018, regarding Application No. EP14173991.2, 4 pages.
Australian Government IP Office Examination Report No. 1 for Standard Patent Application, dated Apr. 9, 2019, regarding Application No. 2014201784, 3 pages.

* cited by examiner

SERVER SYSTEM FOR PROVIDING CURRENT DATA AND PAST DATA TO CLIENTS

BACKGROUND INFORMATION

1. Field

The present disclosure relates generally to a server system and, in particular, to a server system in communication with both data providers and clients. Still more particularly, the present disclosure relates to a server system capable of responding to concurrent requests for data from clients by serving the data to the clients according to policies requested by the clients.

2. Background

Different types of servers and groups of servers may be used to provide data to client applications. The data hosted on a particular server may be received from any number of sources of data. For example, one or more servers may be used to host data acquired from a flight data recorder and acquisition system onboard an aircraft during flight. These one or more servers may include any number of live servers, historical servers, live/historical servers, and/or other types of servers.

As used herein, a "live server" is a server that is only capable of providing live data to client applications. Live data, which may also be referred to as real-time data, may be data that is delivered to a client application substantially immediately after the data has been generated or collected. For example, a live server hosting data acquired from a flight data recorder may be capable of serving this data to a client application as the data is recorded by the flight data recorder without any significant time delays or processing delays.

A "historical server," as used herein, is a server that is only capable of providing historical data, or delayed data, to client applications. For example, a historical server may receive temperature measurements from a weather monitoring system. Upon request for these temperature measurements by a client application, the historical server may provide the temperature measurements to a client application after a 30 minute delay.

As used herein, a "live/historical server" is a server that is capable of concurrently providing both live data and historical data to a client application. A live/historical server may receive live data and be able to store the live data as historical data. The live/historical server may be capable of serving the live data to a client application as the live data is received or serving the historical data to the client application, depending on the particular request made by the client application.

Testing systems, monitoring systems, health information monitoring systems, and/or other types of data collection and analysis systems may use any combination of live servers, historical servers, live/historical servers, and/or other types of servers to service client applications with data. However, some currently available servers may be unable to provide data to multiple client applications concurrently in a manner selected by the client applications as quickly and/or efficiently as desired. For example, some currently available servers may be unable to respond to concurrent requests for both live data and historical data as quickly and/or efficiently as desired.

Further, in some cases, data streams may be received at a server asynchronously. For example, one data stream may be received at a server at one data rate, while another data stream may be received at the server at another data rate that varies over time. Some currently available live/historical data servers may synchronize data that was received asynchronously based on the time indicated by a clock, internal or external to the live/historical data servers. In other words, these data servers may be unable to preserve the timestamps originally associated with the data.

Further, these currently available live/historical data servers may be unable to handle requests from clients requesting that the data be sent to the clients at client-specified data rates. Additionally, some currently available live/historical systems may not be scalable or distributable across multiple pieces of differing hardware. Therefore, it would be desirable to have a method and apparatus that take into account at least some of the issues discussed above, as well as other possible issues.

SUMMARY

In one illustrative embodiment, a data server includes a policy request handler. The policy request handler is activated within the data server in response to a server request being received at the data server. The policy request handler is configured to receive a plurality of asynchronous data streams. The policy request handler is further configured to merge data points in the plurality of asynchronous data streams together to form time-ordered data points. The policy request handler is further configured to form policy-based data according to a server policy identified in the server request using the time-ordered data points.

In another illustrative embodiment, a server system includes a server controller and a set of data servers. The server controller is configured to receive a policy request from a client. The server controller is further configured to generate a number of server requests based on the policy request. A data server in the set of data servers includes a server manager and a policy request handler. The server manager activates a number of policy request handlers in response to receiving a server request in the number of server requests. The policy request handler in the number of policy request handlers is configured to receive a plurality of asynchronous data streams. The policy request handler in the number of policy request handlers is further configured to merge data points in the plurality of asynchronous data streams together to form time-ordered data points. The policy request handler in the number of policy request handlers is further configured to form policy-based data according to a server policy identified in the server request using the time-ordered data points. The policy request handler in the number of policy request handlers is further configured to send the policy-based data to the client as output data.

In yet another illustrative embodiment, a method for handling a server request received at a data server is provided. A policy request handler within the data server is activated in response to receiving the server request. A plurality of asynchronous data streams is received at the policy request handler. Data points in the plurality of asynchronous data streams are merged together by the policy request handler to form time-ordered data points. Policy-based data is formed by the policy request handler according to a server policy identified in the server request using the time-ordered data points.

The features and functions can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the illustrative embodiments are set forth in the appended claims. The illustrative embodiments, however, as well as a preferred mode of use, further objectives and features thereof, will best be understood by reference to the following detailed description of an illustrative embodiment of the present disclosure when read in conjunction with the accompanying drawings, wherein:

DETAILED DESCRIPTION

The different illustrative embodiments recognize and take into account different considerations. For example, the illustrative embodiments recognize and take into account that it may be desirable to have a server system capable of servicing multiple client applications and responding to concurrent requests for live data and/or historical data from these client applications. Further, the illustrative embodiments recognize and take into account that it may be desirable to have a server system that can synchronize the data sent to the client applications with respect to time, or to sequence the data according to the parameters or information represented by the data or the contents of the data.

For example, a server may receive samples of a first output signal generated by a first sensor device at a data rate of about 1000 samples per second and samples of a second output signal generated by a second sensor device at a data rate of about 500 samples per second. However, a client application may desire to receive both samples of the first output signal and samples of the second output signal at a data rate of about 100 samples per second. The illustrative embodiments recognize and take into account that it may be desirable to have a server capable of processing these samples and sending the requested data to the client application in a temporally synchronized manner at the client-specified data rate. Thus, the illustrative embodiments provide a server system for handling data requests from clients. This server system is described in FIG. 1 below.

Figure 1:
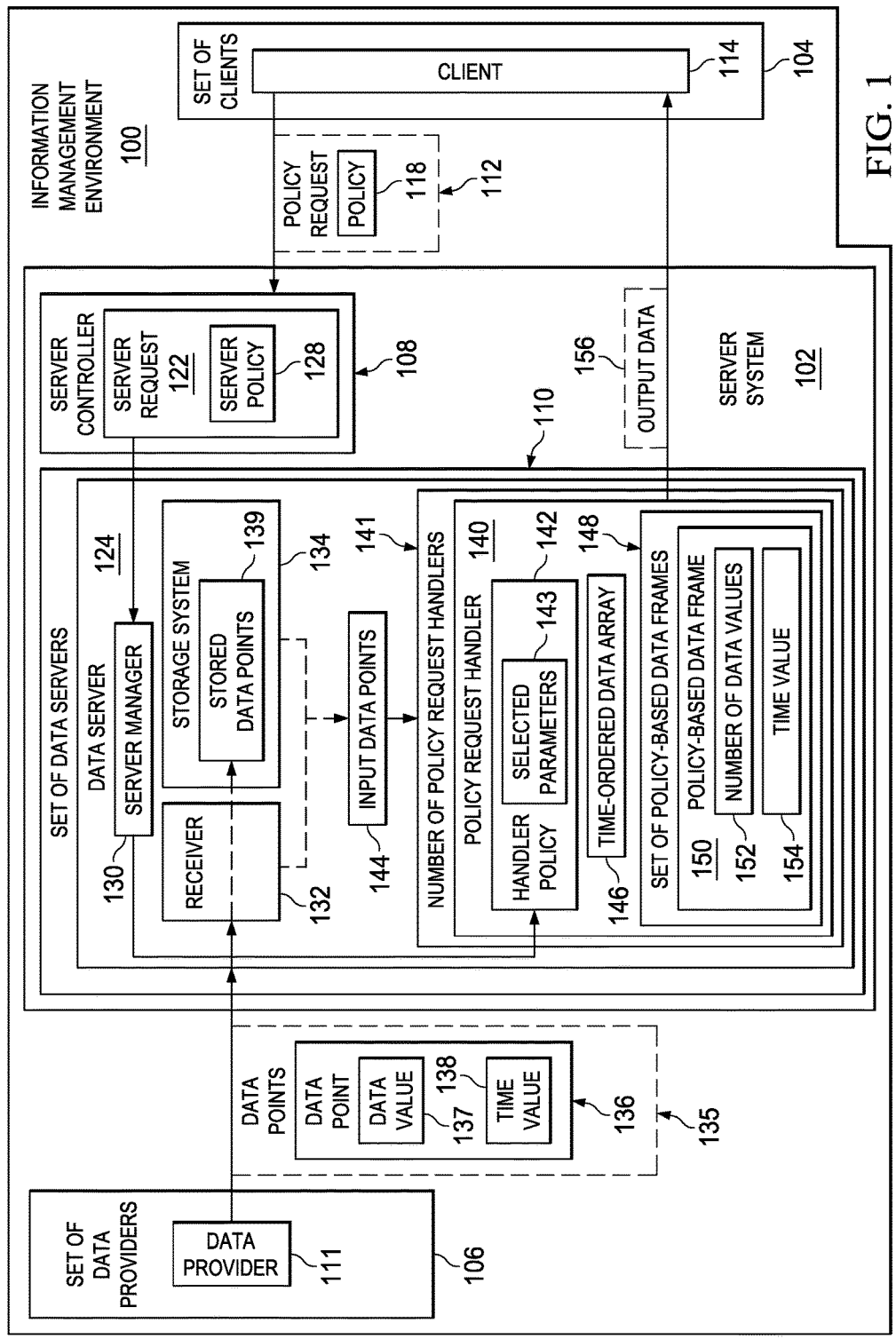
FIG. 1 is an illustration of an information management environment in the form of a block diagram in accordance with an illustrative embodiment.

Referring now to the figures and, in particular, with reference to FIG. 1, an illustration of an information management environment is depicted in the form of a block diagram in accordance with an illustrative embodiment. Information management environment 100 includes server system 102, set of clients 104, and set of data providers 106. As used herein, a "set of" items may be one or more items. In this manner, set of clients 104 may be one or more clients and set of data providers 106 may be one or more data providers.

Server system 102 receives and stores data from set of data providers 106. Server system 102 then services this data to set of clients 104 upon request. A data provider in set of data providers 106 may comprise hardware, software, or a combination of the two. For example, as used herein, a data provider in set of data providers 106 may take the form of a monitoring system, a health monitoring system, a distributed data acquisition system, a sensor device, a sensor system comprised of multiple sensor devices, a computer, an imaging system, a surveillance system, a server, a different server system, an email application, a Web application, or some other type of source of data.

Further, a client in set of clients 104 may comprise hardware, software, or a combination of the two. For example, a client in set of clients 104 may take the form of a desktop computer, a laptop computer, a tablet computer, a mobile phone, a personal digital assistant, a processor unit, a microchip, an integrated circuit, application software, a computer program, a data stabilization system, a display device, a visualization tool, a data viewer, a visual interface program, a virtual reality system, or some other type of requestor of data. When a client is comprised entirely of software, the client may be referred to as a client application.

In this illustrative example, server system 102 includes server controller 108 and set of data servers 110. A data server in set of data servers 110 may be implemented using hardware, software, or a combination of the two. In one illustrative example, each data server in set of data servers 110 may be implemented in a different hardware device. However, in other illustrative examples, two or more data servers may be implemented as part of the same hardware device.

Server controller 108 may be configured to establish communications with each data server in set of data servers 110. In some cases, server controller 108 may be implemented in hardware located remotely with respect to set of data servers 110. In other cases, server controller 108 may be implemented in the same piece of hardware as one or more of set of data servers 110.

Further, server controller 108 may be configured to establish communications with each client in set of clients 104 and each data provider in set of data providers 106. For example, server controller 108 may determine the one or more data servers in set of data servers 110 to which each data provider in set of data providers 106 is to send data.

As one illustrative example, server controller 108 may determine that data provider 111 in set of data providers 106 is to send data to a particular data server in set of data servers 110. In some cases, this particular data server may be configured to receive data from more than one data provider in set of data providers 106. Further, depending on the implementation, data provider 111 may be controlled by server controller 108 to also send data to one or more other data servers in set of data servers 110.

Data provider 111 may send the same portion of data to all of these data servers and/or different portions of data to the different data servers, depending on the implementation. For example, without limitation, data provider 111 may send a portion of data to one data server and then the same portion of data to another data server for backup. This other data server may then be used as a backup data server in the event the first data server becomes unavailable or inaccessible.

In one illustrative example, server controller 108 may determine that data provider 111 is to send data to data server 124 in set of data servers 110. Data server 124 may include server manager 130, receiver 132, and storage system 134. Server manager 130 may be in communication with server controller 108. Server manager 130 may control receiver 132 and storage system 134.

Any data received at data server 124 from a data provider in set of data providers 106 may be received at receiver 132. Server manager 130 may determine when receiver 132 begins receiving data and when receiver 132 stops receiving data from a data provider. In some cases, server manager 130 may control the receiving of data at receiver 132 based on commands from server controller 108.

In this illustrative example, data server 124 may be designated to receive data points 135 from data provider 111. Data points 135 may be received asynchronously in any number of data streams. Each data stream may include a plurality of data points received over time. As used herein, a "data point," such as data point 136 in data points 135, includes data value 137 and time value 138. Data points 135 may be received asynchronously in that different data streams may have different data rates.

Data value 137 is a value for a parameter. As used herein, a "parameter" may be a measurement, a signal, a characteristic, or some other type of measurable property or feature. Data value 137 may be comprised of any number of bits. Examples of different types of parameters may include, but are not limited to, temperature, humidity, speed, altitude, heading, fuel capacity, weight, light intensity, power, or other types of parameters. Data points 135 may include data points for one or more parameters.

Time value 138 is a value indicating the time at which data value 137 was acquired. The time at which data value 137 was "acquired" may be the time at which data value 137 was acquired, or generated, in digital form. In some cases, time value 138 may be referred to as an acquisition time value or an acquisition timestamp. Further, time value 138 may be a time with respect to some reference clock. In one illustrative example, each of set of data providers 106 may be synchronized to this reference clock.

In one illustrative example, data provider 111 may send data points 135 to data server 124 immediately after data provider 111 acquires data points 135 without any time delays or processing delays outside of selected tolerances for this type of data. In this manner, data points 135 may be referred to as current data points, live data points, real-time data points, or near real-time data points.

Further, data provider 111 may be configured such that data points 135 are sent to receiver 132 in monotonically-increasing time order per parameter. In other words, all data points for a particular parameter may be received ordered with respect to time, with the earliest acquired data points being received at data server 124 first.

However, in some cases, data points received for different parameters may not be ordered with respect to time. In other words, a first data point for a first parameter may be received at receiver 132 before a second data point for a second parameter even when the first data point has a time value that is later than the time value for the second parameter. However, all data points for that first parameter may be received in time order and all data points for the second parameter may be received in time order.

Further, the data values for data points 135 may have been acquired at different data rates. For example, the data values for one parameter may have been acquired at a different data rate than the data values for another parameter. In this manner, the data values for data points 135 may have been acquired asynchronously or in a nondeterministic manner.

Of course, in other cases, the data values for data points 135 may have been acquired synchronously. As one illustrative example, data points 135 may include data points for two parameters. The data values acquired for these two parameters may have been acquired at a same specified data rate. In this manner, the data values for data points 135 may have been acquired synchronously, or at a predetermined data rate.

In this illustrative example, storage system 134 receives data points 135 from receiver 132 and stores data points 135. Once stored in storage system 134, data points 135 may be referred to as stored data points 139. Each stored data point in stored data points 139 may preserve the data value and time value of the original data point. In some cases, stored data points 139 may also be referred to as historical data points or recorded data points.

Storage system 134 may take a number of different forms. In one illustrative example, storage system 134 may include a caching system and disk storage. Of course, any number of disk storage devices, types of memory, and/or other types of data storage devices may be included in storage system 134.

In this manner, server controller 108 may manage the distribution of data from set of data providers 106 to set of data servers 110. Server controller 108 may also manage the distribution of data from set of data servers 110 to set of clients 104.

For example, server controller 108 may be configured to receive and handle any number of policy requests from set of clients 104. As used herein, a "policy request" is a means by which a client, such as one of set of clients 104, may access data from one or more data servers, such as set of data servers 110. In particular, a policy request is a request for data according to a policy.

As used herein, a "policy" is the word used to describe the manner in which data is delivered to a client. In other words, a policy describes how a data server controls the way in which data is delivered to a client in response to a request for the data from the client. By specifying a particular policy within a policy request, the client identifies the manner in which the client desires to receive data. An example of one manner in which a policy request may be implemented is described in FIG. 2 below.

In one illustrative example, server controller 108 receives policy request 112 from client 114 in set of clients 104. Client 114 generates policy request 112 when client 114 desires to access data that is hosted on set of data servers 110.

Policy request 112 is a request for data according to policy 118. Policy 118 may indicate at least one of a type of data, a time and/or date range for the data, a format in which the data is to be sent to client 114, a manner in which the data is to be sorted, sequenced, formatted, and/or otherwise processed before being sent to client 114, a specified data rate at which data is to be sent to client 114, or some other type of instruction or requirement for the manner in which the data is to be served to client 114.

As used herein, the phrase "at least one of," when used with a list of items, means different combinations of one or more of the listed items may be used and only one of the items in the list may be needed. The item may be a particular object, thing, or category. In other words, "at least one of" means any combination of items or number of items may be used from the list, but not all of the items in the list may be required.

For example, "at least one of item A, item B, and item C" may mean item A; item A and item B; item B; item A, item B, and item C; or item B and item C. In some cases, "at least one of item A, item B, and item C" may mean, for example, without limitation, two of item A, one of item B, and ten of item C; four of item B and seven of item C; or some other suitable combination.

In response to receiving policy request 112 from client 114, server controller 108 may determine which one or more of set of data servers 110 is hosting the data being requested by client 114. In some cases, one data server may host all of the requested data. In other cases, one data server may host a first portion of the requested data, while another data server hosts a second portion of the requested data.

For each data server in set of data servers 110 identified as hosting some portion of the requested data, server controller 108 may forward information about policy request 112 to that data server. This information may be referred to as policy request information and may be sent to a data server in the form of a server request. For example, server controller 108 may identify data server 124 as hosting a portion of the requested data. As described above, this portion may be some or all of the requested data. In this illustrative example, server controller 108 may generate server request 122 for data server 124 and send server request 122 to data server 124.

As depicted, server request 122 may be a request for data according to server policy 128. Server policy 128 may include the portion of policy 118 that corresponds to the portion of requested data that is hosted on data server 124. In other words, server policy 128 may indicate the manner in which data server 124 is to service data to client 114.

In this illustrative example, data server 124 receives and processes server request 122. In particular, server manager 130 may receive server request 122 from server controller 108. When server manager 130 receives server request 122, server manager 130 activates number of policy request handlers 141 to handle server request 122. As used herein, a "number of" items may include one or more items. In this manner, number of policy request handlers 141 may include one or more policy request handlers.

Number of policy request handlers 141 may be configured to gather the data being requested by client 114 and then send this data to client 114. Policy request handler 140 may be an example of one of number of policy request handlers 141. Based on server request 122, server manager 130 determines whether policy request handler 140 is to gather this data directly from receiver 132 or from storage system 134.

Further, server manager 130 sends handler policy 142 to policy request handler 140 identifying whether policy request handler 140 is to receive this data directly from receiver 132 or from storage system 134. In some cases, handler policy 142 may also identify selected parameters 143 for which data is to be received.

The data received by policy request handler 140 may be referred to as input data points 144. When input data points 144 are to be received from receiver 132, server manager 130 commands receiver 132 to send a portion of or all of data points 135 being received at receiver 132 to policy request handler 140. In this manner, in addition to sending data points 135 to storage system 134 as data points 135 are received at receiver 132, receiver 132 sends some or all of data points 135 received at receiver 132 to policy request handler 140 to form input data points 144.

In one illustrative example, receiver 132 may send every one of data points 135 received at receiver 132 to policy request handler 140. In another illustrative example, receiver 132 may send only the portion of data points 135 corresponding to selected parameters 143 specified in handler policy 142 to policy request handler 140.

When input data points 144 are to be received from storage system 134, server manager 130 may determine from which storage device or memory unit in storage system 134 this portion of stored data points 139 is to be retrieved. Policy request handler 140 may retrieve this portion of stored data points 139 to form input data points 144.

Policy request handler 140 may receive input data points 144 in monotonically increasing time order per parameter. However, input data points 144 for different parameters may not be in time order. As policy request handler 140 receives input data points 144, policy request handler 140 merges the data points for different parameters together to form time-ordered data array 146. Time-ordered data array 146 may be a single array of data points in which all of the data points are ordered with respect to the time, regardless of the parameters to which the data points correspond.

Policy request handler 140 may process time-ordered data array 146 to form output data 156 to be sent to client 114. Handler policy 142 may identify whether data is to be sent to client 114 in an asynchronous manner or a synchronous manner.

When data is to be sent to client 114 in an asynchronous manner, policy request handler 140 sends every data point in time-ordered data array 146 to client 114. Each data point sent to client 114 may include the original time value indicating the time at which the data point was acquired.

When data is to be sent to client 114 in a synchronous manner, policy request handler 140 may form set of policy-based data frames 148 using time-ordered data array 146 and a specified data rate indicated in handler policy 142. Each policy-based data frame in set of policy-based data frames 148 may be associated with the occurrence of an event.

The event may also be referred as a trigger. The event may be, for example, but is not limited to, the lapsing of a time interval, a data trigger event, a time trigger event, or some other type of event. The data trigger event may be, for example, without limitation, a data value changing to a value above or below some selected threshold, a selected number of repeat data values having been identified, or some other type of trigger.

Policy-based data frame 150 may be an example of a policy-based data frame in set of policy-based data frames 148 formed for a particular event. Policy-based data frame 150 may include number of data values 152 and time value 154. Time value 154 may be the time at which the particular event occurred. In one illustrative example, the event may be the lapse of a time interval based on the specified data rate. Number of data values 152 may include the last known data value for each parameter in selected parameters 143 at time value 154.

In this manner, policy request handler 140 forms set of policy-based data frames 148 according to handler policy 142 such that the data points in set of policy-based data frames 148 may be presented to client 114 in the manner requested by client 114. Thus, the same data may be presented to client 114 in a number of different ways, depending on handler policy 142.

Policy request handler 140 may send set of policy-selected data frames 148 to client 114 in the form of output data 156. Output data 156 may include one or more data packets that are sent to client 114 over time.

In some illustrative examples, server manager 130 may activate only one policy request handler per server request received. However, in other illustrative examples, server manager 130 may activate more than one policy request handler to handle a single server request. For example, each of number of policy request handlers 141 may be spawned by server manager 130 to service a particular portion of server request 122.

In this manner, all requests for data originating from a client in set of clients 104, such as client 114, may be received by server controller 108 and appropriately distributed to set of data servers 110 by server controller 108. These data requests may then be handled by policy request handlers that send the requested data directly to the client. The communication between a policy request handler, such as policy request handler 140, and a client, such as client 114, may only occur in one direction in this illustrative example. Further, a policy request handler may never communicate directly with server controller 108 in this illustrative example.

The communications between set of data providers 106, server controller 108, set of data servers 110, and set of clients 104 may be performed using any number of different types of communications links. For example, wireless communications links, wired communications links, optical communications links, and/or other types of communications links may be used.

Thus, the illustrative embodiments provide a server system and a method for handling policy requests from clients. For example, set of data servers 110 in server system 102 in FIG. 1 may receive and record data streams from multiple data providers in substantially real-time. Using policy request handlers, set of data servers 110 may process data and service this data to clients, such as set of clients 104 in FIG. 1, at very high data rates.

Further, set of data servers 110 may be capable of simultaneously servicing data to different clients at different data rates. The potential data rates at which data may be serviced to set of clients 104 may only be bound by the hardware being used. With server system 102 described in FIG. 1, data latency may be significantly reduced to within selected tolerances.

Further, server system 102 may be distributed and scalable to suit the needs of any number of data providers and/or any number of clients. For example, to increase data throughput, a new data server may be added to set of data servers 110. The management functions performed by server controller 108 may allow the new data server to be added to set of data servers 110 seamlessly without any undesired modifications to the overall architecture of server system 102.

Figure 2:
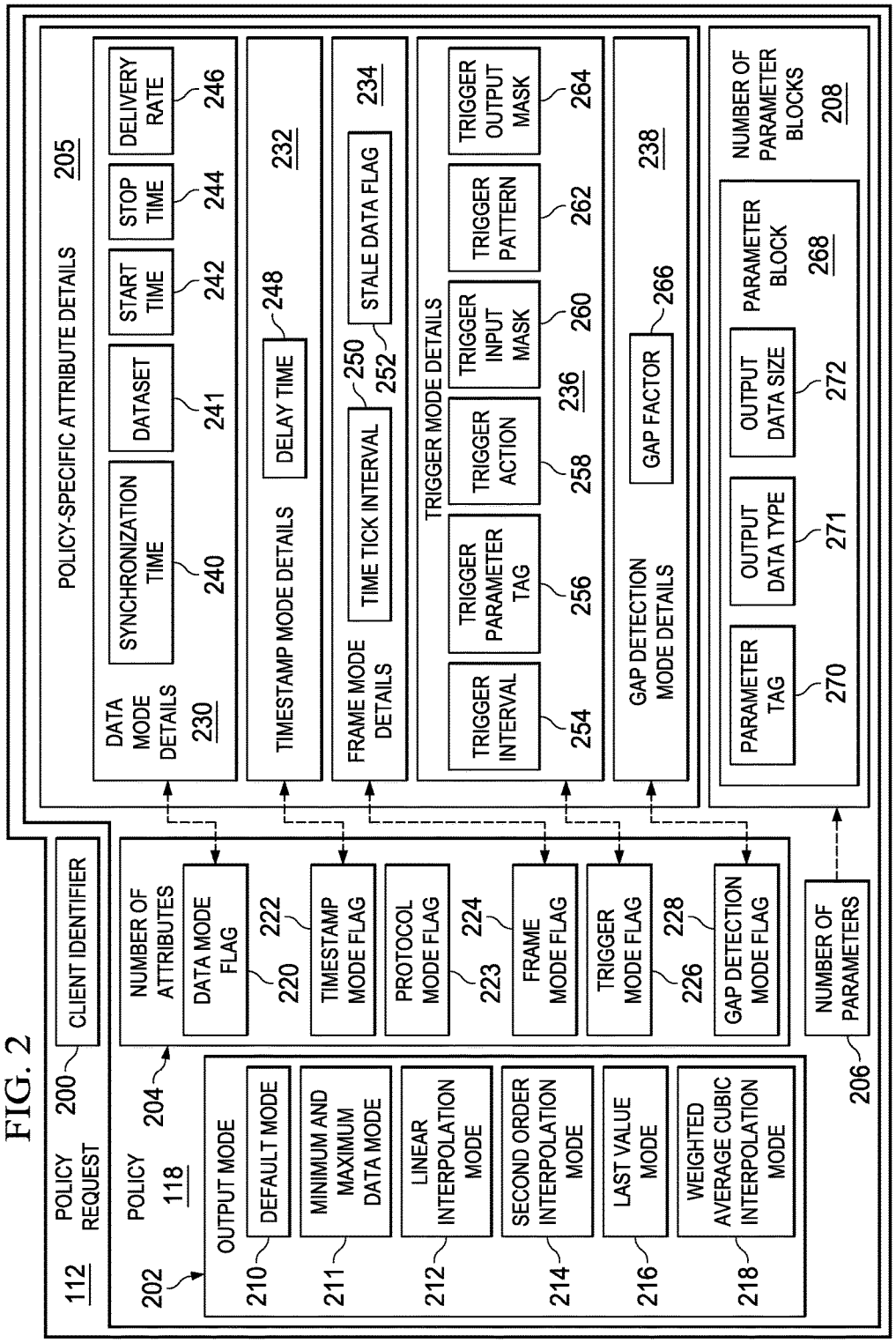
FIG. 2 is an illustration of a policy request in the form of a block diagram in accordance with an illustrative embodiment.

With reference now to FIG. 2, an illustration of policy request 112 from FIG. 1 is depicted in the form of a block diagram in accordance with an illustrative embodiment. In this illustrative example, an example of one manner in which policy request 112, generated by client 114 in FIG. 1, may be implemented is depicted.

Policy request 112 may include, for example, without limitation, client identifier 200 and policy 118. Client identifier 200 may be, for example, a field for identifying the particular client requesting to access data from server system 102. In this illustrative example, some type of identifier for client 114 may be entered in client identifier 200.

Policy 118 includes all of the details defining how server system 102 in FIG. 1 is to service data to client 114. As depicted, policy 118 may include output mode 202, number of attributes 204, policy-specific attribute details 205, number of parameters 206, and number of parameter blocks 208, each of which may be defined by client 114 and/or the user of client 114.

Output mode 202 may be a field for identifying the mode of the data to be output to client 114 in each frame of data sent to client 114. The value entered in output mode 202 may identify one of a number of different modes that may include, but are not limited to, default mode 210, minimum and maximum data mode 211, linear interpolation mode 212, second order interpolation mode 214, last value mode 216, and weighted average cubic interpolation mode 218. These modes may be described below in relation to number of attributes 204.

As used herein, an "attribute," such as one of number of attributes 204, may define how data is being requested, how data is to be formatted, how data is to be delivered, and/or other aspects of the manner in which client 114 desires to receive data. Number of attributes 204 may include a number of flags for use in identifying the manner in which data is to be delivered to client 114. In one illustrative example, number of attributes 204 may include data mode flag 220, timestamp mode flag 222, protocol mode flag 223, frame mode flag 224, trigger mode flag 226, and gap detection mode flag 228. Each of these flags may be set to a value that defines some aspect of policy 118 and what other information is included in policy 118.

The value entered for data mode flag 220 identifies whether client 114 is interested in live data or historical data. When data mode flag 220 is set for live data, policy 118 is considered a live policy and policy request 112 is considered a live policy request. When data mode flag 220 is set for historical data, policy 118 is considered a historical policy and policy request 112 is considered a historical policy request.

The value entered for timestamp mode flag 222 identifies whether client 114 is interested in the time values for data points indicating the times at which data points were acquired or corrected time values. For example, in some cases, time value 138 for data point 136 may be later than the actual time at which data value 137 for data point 136 was acquired. This delay may be due to the processing of data value 137 through an analog filter or some other type of processing delay. Within server system 102, a policy request handler, such as policy request handler 140 in FIG. 1, may be able to correct time value 138 for data point 136 prior to sending data point 136 and/or data value 137 of data point 136 to client 114.

In this illustrative example, the value entered for protocol mode flag 223 may identify the network protocol to be used when sending data to client 114. As one illustrative example, the value entered for protocol mode flag 223 may specify that either a user datagram protocol (UDP) or a transmission control protocol (TCP) is to be used.

The value entered for frame mode flag 224 may identify whether framing is being enabled or disabled. For example, when framing is enabled, all data points for a selected set of parameters that were acquired at about a particular time or within a particular time range may be framed and associated with a single time value. In this manner, data may be output to client 114 synchronously. However, when framing is disabled, each of the data points may be individually sent to client 114 with the original time value for the data point. In this manner, when framing is disabled, data may be output to client 114 asynchronously.

Further, the value entered for trigger mode flag 226 identifies how the data output to client 114 is to be triggered. For example, the data may be triggered at some specified time interval or based on some specified data value occurring within a data stream. In other words, the data may be time triggered or data triggered.

The value entered for gap detection mode flag 228 may determine whether the gap detection mode is enabled or disabled. When the gap detection mode is enabled, a stale alert may be sent to client 114 when no data values for a particular parameter have been sent to client 114 over some selected period of time.

In this illustrative example, policy-specific attribute details 205 included in policy 118 may provide the details associated with the different attributes in number of attributes 204. For example, policy-specific attribute details 205 may include data mode details 230, timestamp mode details 232, frame mode details 234, trigger mode details 236, and gap detection mode details 238, which may include details based on the value entered for data mode flag 220, timestamp mode flag 222, frame mode flag 224, trigger mode flag 226, and gap detection mode flag 228, respectively.

For example, when data mode flag 220 is set for live data, data mode details 230 may include synchronization time 240. Synchronization time 240 may be the time to which live policies are synchronized. Further, when data mode flag 220 is set for live data, data mode details 230 may include dataset 241, start time 242, stop time 244, and delivery rate 246. Dataset 241 may be a field for specifying the particular dataset from which the historical data is being requested. Start time 242 and stop time 244 may be fields for specifying the time range within which stored data points having time values within this time range are being requested. Delivery rate 246 may be a field for specifying the rate at which data is to be sent to client 114.

When timestamp mode flag 222 is set such that corrected time values are to be sent to client 114, timestamp mode details 232 may include delay time 248. Delay time 248 may be a field for identifying the maximum delay time to wait for data before outputting a data frame or data point to client 114. Delay time 248 may identify the limit to the amount of time allowed to correct for known processing delays in the time values for data points.

When frame mode flag 224 is set such that framing is disabled, frame mode details 234 may not include any details. However, when frame mode flag 224 is set such that framing is enabled, frame mode details 234 may include time tick interval 250 and stale data flag 252.

Time tick interval 250 is a field for specifying the minimum interval, typically in nanoseconds, at which time ticks are to be sent as data points to client 114. In one illustrative example, a time tick may be a data point comprising an empty data value and an empty time value. In other cases, a time tick may be a data point comprising an empty data value and a time value that represents the time at which the time tick was formed. Stale data flag 252 may be a field for specifying whether server system 102 is to forward all data values for parameters that have gone stale at the time of a trigger event or only non-stale data values.

When trigger mode flag 226 is set such that the data is to be time triggered, trigger mode details 236 may include trigger interval 254. Trigger interval 254 may be a field for identifying the time interval, typically in nanoseconds, at which server system 102 is to trigger a data frame or a data point to be output to client 114. This time interval may be referred to as a trigger interval and the time at which this "trigger" occurs may be referred to as a "trigger time."

When trigger mode flag 226 is set such that the data is to be data triggered, trigger mode details 236 may include trigger parameter tag 256, trigger action 258, trigger input mask 260, trigger pattern 262, and trigger output mask 264. Trigger parameter tag 256 may be a field for identifying the parameter for which a trigger will cause a data frame or data point to be sent to client 114. This parameter may be referred to as a trigger parameter. A default value such as, for example, 0, NULL, or some other default value may be entered in trigger parameter tag 256 to indicate that a data frame or data point for any and all parameters may be output at a trigger time.

Trigger action 258 may be a field that identifies the trigger or trigger action that will cause a data frame or data point to be output to client 114. The trigger may be selected from one of, for example, without limitation, data being received, data changing, data not changing, data matching a pattern, and data not matching a pattern. Data being received may include a data value for the parameter identified by trigger parameter tag 256 being received at a policy request handler. Data changing may include at least one bit of a data value for the trigger parameter.

For example, data points all having the same data value for the trigger parameter may be received at a policy request handler. When the data value for the trigger parameter changes by at least one bit, the trigger occurs and a data frame or the data point with the different data point may be sent to client 114.

Data not changing may include a data value for the trigger parameter not changing over some selected period of time. In this manner, the trigger may be that data for the trigger parameter is unchanged.

The entries for trigger input mask 260 and trigger pattern 262 may be used in evaluating whether the trigger of data matching a trigger pattern or data not matching a trigger pattern has occurred. Trigger input mask 260 may be a field for defining the bits within a data value for the trigger parameter to which a trigger pattern is to be applied. These bits may be referred to as an input mask. Trigger pattern 262 may be the field identifying the trigger pattern to be applied to the bits within the input mask.

Thus, when trigger action 258 is set to data matching a pattern, a data frame or data point is output to client 114 when a data value for the trigger parameter matches the trigger pattern after the input mask has been applied to the data value. Conversely, when trigger action 258 is set to data not matching a pattern, a data frame or data point is output to client 114 when a data value for the trigger parameter does not match the trigger pattern after the input mask has been applied to the data value.

Trigger output mask 264 may be a field identifying the bits within a data value for the trigger parameter to be output to client 114 if a trigger has occurred. These bits may be referred to as an output mask. Once a trigger has occurred, the output mask may be applied to the data value that caused the trigger to occur and the bits that fall within the output mask may be output to client 114.

In this illustrative example, when gap detection mode flag 228 is set such that gap detection mode is enabled, gap detection mode details 238 may include gap factor 266. Gap factor 266 may be a field that identifies the amount of stale data that that server system 102 will assume is a "gap" in the data. In other words, the entry for gap factor 266 defines the period of time during which no data values for a parameter may arrive at a policy request handler to be considered a "gap." This amount of time may be referred to as the gap factor.

Number of parameters 206 in policy 118 may be a field for specifying the number of parameters for which data is being requested. Number of parameters 206 may be, for example, any positive integer value other than zero. Each of number of parameter blocks 208 may be a block of one or more fields that provides information for outputting data for a corresponding parameter.

Parameter block 268 may be an example of one of number of parameter blocks 208. Parameter block 268 may include parameter tag 270, output data type 271, and output data size 272. Parameter tag 270 may be a field for identifying a particular parameter. Output data type 271 may be a field for identifying the data format to be used in outputting data for the particular parameter to client 114. Output data size 272 may be a field for identifying the size for each data type that may be specified by output data type 271.

When the value entered for output mode 202 selects minimum and maximum data mode 211, server system 102 selects the data points having the minimum and maximum data values within a trigger interval for each parameter identified in number of parameter blocks 208. The data values and time values for these data points may then be used to form output data 156 to be sent to client 114 based on policy-specific attribute details 205 and number of parameter blocks 208.

When the value entered for output mode 202 selects linear interpolation mode 212, the data point immediately preceding a trigger time and the data point immediately following the trigger time may be selected for each parameter identified in number of parameter blocks 208. A data value for the trigger time may be interpolated using the data values and the time values for these two data points. This data value and the trigger time may be used to form output data 156 to be sent to client 114 based on policy-specific attribute details 205 and number of parameter blocks 208.

Further, when the value entered for output mode 202 selects second order interpolation mode 214, the two data points immediately preceding a trigger time and the two data points immediately following the trigger time are selected for each parameter identified in number of parameter blocks 208. A data value for this trigger time may be interpolated using the data values and the time values for these four data points. This data value and the trigger time may be used to form output data 156 to be sent to client 114 based on policy-specific attribute details 205 and number of parameter blocks 208.

When the value entered for output mode 202 selects last value mode 216, the most recent data point at a trigger time is selected for each parameter identified in number of parameter blocks 208. This data point may be a data point having a time value equal to the trigger time. The data value for this data point is used to form output data 156 based on policy-specific attribute details 205 and number of parameter blocks 208.

When the value entered for output mode 202 selects weighted average cubic interpolation mode 218, the three data points immediately preceding a trigger time and the three data points immediately following the trigger time are selected for each parameter identified in number of parameter blocks 208. A data value for each parameter at this trigger time may be interpolated using the data values and the time values for these six data points. This data value and the trigger time may be used to form output data 156 to be sent to client 114 based on policy-specific attribute details 205 and number of parameter blocks 208.

In some cases, the value entered for output mode 202 may select default mode 210. In one illustrative example, default mode 210 may be last value mode 216. Of course, some other type of mode may be selected for default mode 210 in other examples. Further, other modes in addition to the ones described may be selected by the value entered for output mode 202 in other illustrative examples.

In this manner, client 114 may be able to very specifically define the manner in which data is to be output to client 114 using policy 118. The portion of policy 118 that may be handled by a particular server may be referred to as a server policy, such as server policy 128 in FIG. 1. Further, the portion of a server policy to be handled by a policy request handler, such as policy request handler 140 in FIG. 1, may be referred to as a handler policy, such as handler policy 142 in FIG. 1.

In some cases, server policy 128 may include all of policy 118. Further, in some cases, handler policy 142 may include all of policy 118. Each policy request handler spawned by server system 102 to handle policy request 112 generated by client 114 may use the details included within policy 118 to control the manner in which data is output to client 114.

Any combination of attributes such as those described in number of attributes 204 may be included in a policy. Further, any combination and/or permutation of number of attributes 204 may be included in a policy. Still further, any combination and/or permutation of the details described in policy-specific attribute details 205 may be included in a policy.

The illustrations of information management environment 100 in FIG. 1 and policy request 112 in FIGS. 1-2 are not meant to imply physical or architectural limitations to the manner in which an illustrative embodiment may be implemented. Other components in addition to or in place of the ones illustrated may be used. Some components may be optional. Also, the blocks are presented to illustrate some functional components. One or more of these blocks may be combined, divided, or combined and divided into different blocks when implemented in an illustrative embodiment.

Figure 3:
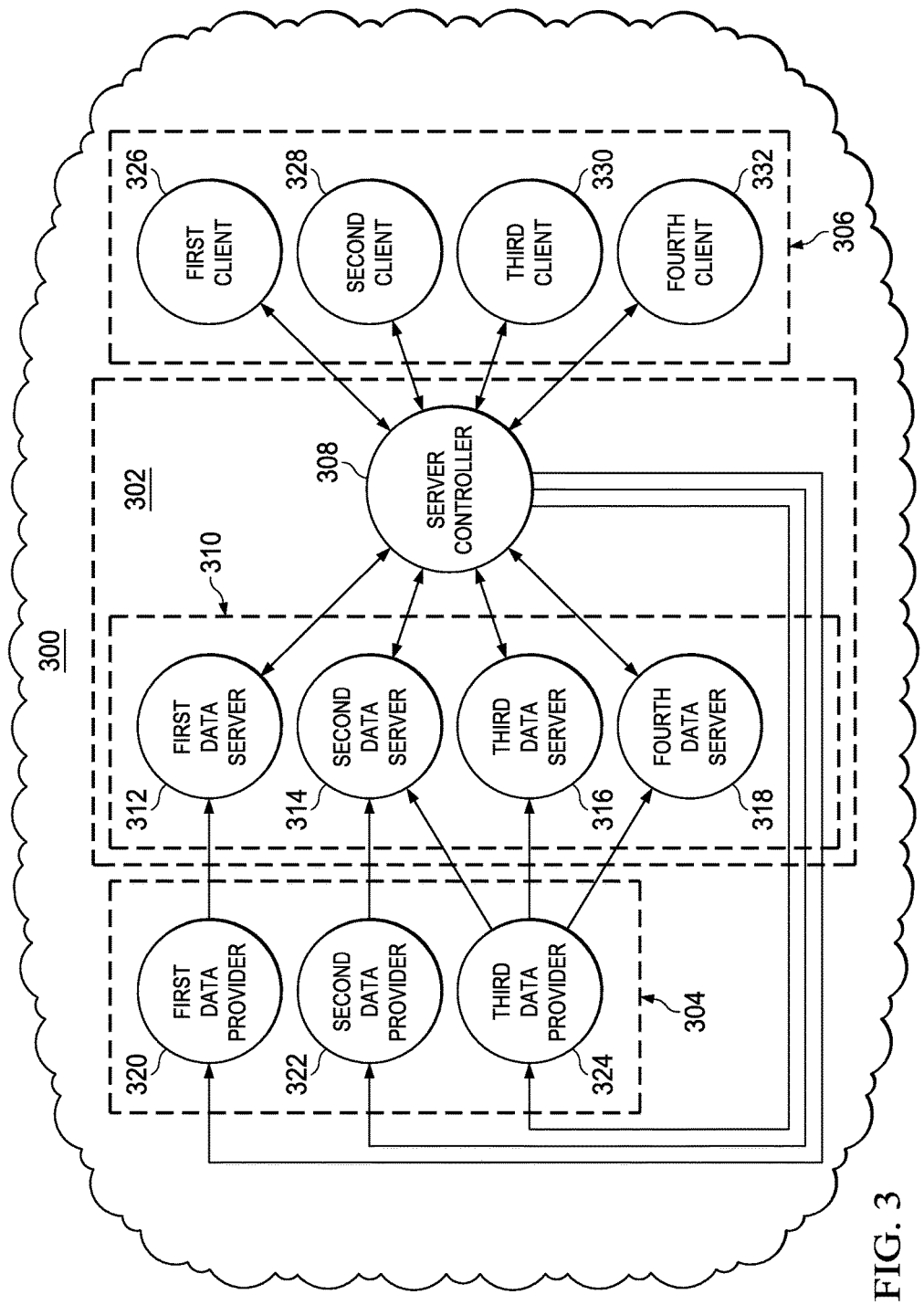
FIG. 3 is an illustration of an information management environment in accordance with an illustrative embodiment.

With reference now to FIG. 3, an illustration of an information management environment is depicted in accordance with an illustrative embodiment. In this illustrative example, information management environment 300 is an example of one implementation for information management environment 100 in FIG. 1.

As depicted, information management environment 300 includes server system 302, set of data providers 304, and set of clients 306. Server system 302, set of data providers 304, and set of clients 306 are examples of implementations for server system 102, set of data providers 106, and set of clients 104, respectively, in FIG. 1. Server system 302 is configured to host data acquired from set of data providers 304 and serve this data to set of clients 306 upon request.

In this illustrative example, server system 302 includes server controller 308 and set of data servers 310. Server controller 308 and set of data servers 310 are examples of implementations for server controller 108 and set of data servers 110, respectively, in FIG. 1.

Server controller 308 may communicate with set of data providers 304, set of clients 306, and set of data servers 310. In particular, server controller 308 may determine to which one or more of set of data servers 310 a particular data provider in set of data providers 304 is to send data. Further, server controller 308 may determine whether a particular data provider is to send data to more than one of set of data servers 310.

As depicted, set of data servers 310 includes first data server 312, second data server 314, third data server 316, and fourth data server 318. Set of data providers 304 includes first data provider 320, second data provider 322, and third data provider 324. Set of data providers 304 may be synchronized to the same time source such that the time values of the data points sent from set of data providers 304 to set of data servers 310 may be correlated.

Further, set of clients 306 includes first client 326, second client 328, third client 330, and fourth client 332. Server controller 308 may be in communication with each of these different data servers, data providers, and clients.

In this illustrative example, server controller 308 has determined that first data provider 320 is to send data to first data server 312. Server controller 308 has determined that second data provider 322 is to send data to second data server 314. Further, server controller 308 has determined that third data provider 324 is to send a different portion of data to each of second data server 314, third data server 316, and fourth data server 318. In this manner, second data server 314 may receive data from two different data providers.

Figure 4:
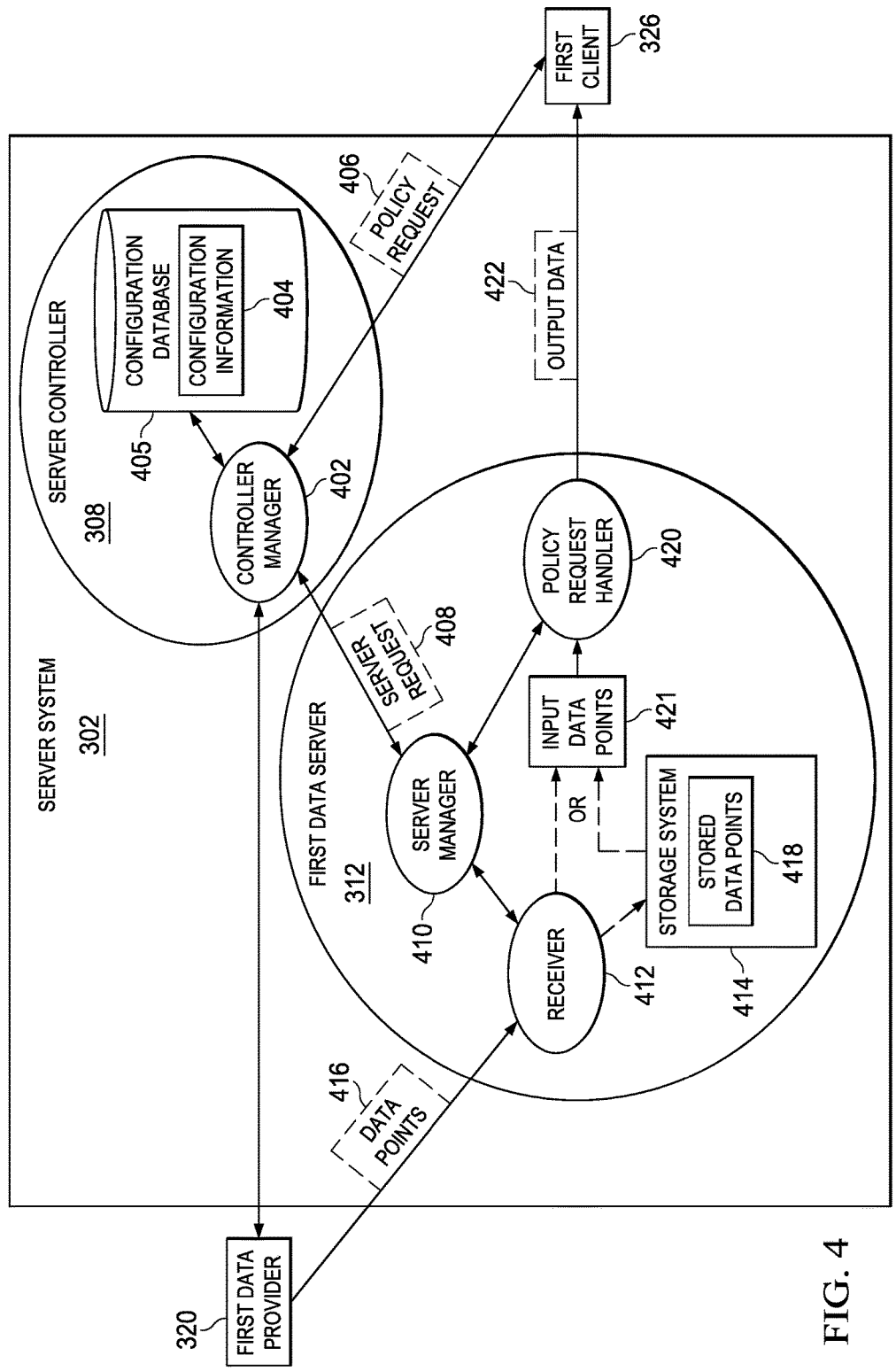
FIG. 4 is an illustration of a data server and a server controller in accordance with an illustrative embodiment.

With reference now to FIG. 4, an illustration of first data server 312 and server controller 308 from FIG. 3 is depicted in accordance with an illustrative embodiment. As depicted in this example, server controller 308 may include controller manager 402. Controller manager 402 may be configured to access, add to, and retrieve configuration information 404.

In one illustrative example, configuration information 404 may be stored in configuration database 405. However, in other illustrative examples, configuration information 404 may be stored in some other type of data structure and/or in local memory outside of server controller 308.

Configuration information 404 may include information about set of data providers 304, set of clients 306, and set of data servers 310 from FIG. 3. This information may be referred to as metadata.

For example, configuration information 404 may include information about policy requests made by set of clients 306. Additionally, configuration information 404 may include information about the one or more data providers in set of data providers 304 from which each of set of data servers 310 is designated to receive data. Configuration information 404 may also include information about the one or more data servers in set of data servers 310 to which each of set of data providers 304 is to send data.

As depicted, controller manager 402 may be configured to communicate with first client 326. This communication may be two-way communication between controller manager 402 and first client 326. In some cases, only one communications connection between controller manager 402 and first client 326 may be allowed at any given point in time.

In one illustrative example, first client 326 sends policy request 406 to controller manager 402. Policy request 406 may be an example of one implementation for policy request 112 in FIG. 1. Further, policy request 406 may include a policy implemented in a manner similar to policy 118 described in FIG. 2. Controller manager 402 may be configured to generate a number of server requests based on policy request 406.

For example, controller manager 402 may use configuration information 404 to determine that at least a portion of the data being requested by policy request 406 is hosted on first data server 312. Controller manager 402 generates server request 408 and sends server request 408 to first data server 312. Server request 408 may include a server policy that includes the portion of the policy in policy request 406 that is to be handled by first data server 312.

Further, controller manager 402 sends a message to first client 326 letting first client 326 know that first data server 312 will be sending at least a portion of the requested data to first client 326. In this manner, first client 326 may be able to prepare to receive data from first data server 312. For example, first client 326 may initiate establishing a communications link within first data server 312.

As depicted, first data server 312 includes server manager 410, receiver 412, and storage system 414. Server manager 410, receiver 412, and storage system 414 may be examples of implementations for server manager 130, receiver 132, and storage system 134, respectively, in FIG. 1.

In this illustrative example, receiver 412 receives data points 416 from first data provider 320. Data points 416 may be received in one or more data streams. For example, data points 416 may be received in two data streams, with the first data stream being comprised of data points for a first parameter and the second data stream being comprised of data points for a second parameter.

As receiver 412 receives data points 416, receiver 412 sends data points 416 to storage system 414. Once stored within storage system 414, data points 416 may be referred to as stored data points 418.

Server manager 410 controls when receiver 412 begins and stops receiving data points 416 from first data provider 320. Further, in some cases, server manager 410 may control the manner in which data points 416 are stored within storage system 414.

In this illustrative example, server request 408 may be received by server manager 410. Server request 408 may be a request for data for selected parameters. Server manager 410 may determine whether server request 408 is a live request or a historical request for the selected parameters.

As used herein, a "live request" may be a request for data in substantially real-time or near real-time. More specifically, a live request may be a request to receive data as the data is acquired without any unintentional or unexpected processing delays. In this manner, servicing server request 408 when server request 408 is a live request may include sending data points to first client 326 as first data server 312 receives data points 416 from first data provider 320 without any unintentional or unexpected processing delays.

In some cases, a live request may take the form of a delayed live request. A delayed live request may be a request to receive data points with some type of delay applied to the time values of the data points. This delay may be selected by the client. In some cases, the delay may be applied to correct for filter delays associated with the acquisition of data values for a particular parameter.

As used herein, a "historical request" may be a request for data that was acquired within some selected period of time. For example, a historical request may be a request for data points acquired for selected parameters within a selected period of time in the past.

Further, a live request and a historical request may take the form of either an every sample request or a framed request. When server request 408 takes the form of an every sample live request, every data point received at receiver 412 for each of the selected parameters may be sent to first client 326. When policy request 406 takes the form of an every sample historical request, every data point stored in storage system 414 for the selected parameters that was acquired within a selected period of time may be sent to first client 326. With these types of every sample requests, each data point sent to first client 326 may be sent with the original time value associated with that data point.

With a framed request, multiple policy-based data frames, similar to policy-based data frame 150 in FIG. 1, are sent to first client 326. Each policy-based data frame may be formed in response to the occurrence of an event. The event may be, for example, the lapse of a time interval. Each policy-based data frame formed may be comprised of the last known data value for each of the selected parameters at the time at which the corresponding event occurred.

In response to receiving server request 408, server manager 410 processes server request 408. In this illustrative example, server request 408 takes the form of either a live request or a historical request, but not both. In this manner, only one policy request handler may be needed to service server request 408. However, in other illustrative examples, server request 408 may include both a live request and a historical request. In these examples, server manager 410 may need to activate at least two policy request handlers to service server request 408.

As depicted, server manager 410 activates policy request handler 420 to handle server request 408. Policy request handler 420 may be an example of one implementation for policy request handler 140 in FIG. 1.

Server manager 410 determines whether receiver 412 or storage system 414 will be the source of input data points 421 for policy request handler 420. When server request 408 is a live request, server manager 410 selects receiver 412 as the source for input data points 421. When server request 408 is a historical request, server manager 410 selects storage system 414 as the source for input data points 421.

When receiver 412 is selected as the source for input data points 421, server manager 410 determines which portion of data points 416 received at receiver 412 will be sent to policy request handler 420 as input data points 421. Based on commands received from server manager 410, receiver 412 may send some or all of data points 416 received from first data provider 320 to policy request handler 420.

For example, in some cases, receiver 412 may send all of the data points received in both a first data stream and a second data stream to policy request handler 420. In another example, receiver 412 may only send the data points received in the first data stream to policy request handler 420.

In this illustrative example, each of data points 416 received at receiver 412 may include a data value and a time value. The data value may be the value for a particular parameter. For example, the data value may be the measured quantity for a particular parameter. If the parameter is altitude, the data value may be 10,000 feet. The time value may be the time at which the data value was acquired in digital form.

In some cases, a data point may take the form of a time tick. Time ticks may be sent from first data provider 320 to receiver 412 periodically based on some selected time interval. For example, a time tick may be sent to receiver 412 about every 1 millisecond. Time ticks may constitute a data stream that is sent to receiver 412 from first data provider 320 to receiver 412.

In one illustrative example, a time tick may be a data point comprising an empty data value and an empty time value. In other cases, a time tick may be a data point comprising an empty data value and a time value that represents the time at which the time tick was formed. This time may be with respect to the same time source to which set of data providers 304 are synchronized. In these illustrative examples, a data server, such as first data server 312, may be configured to only receive time ticks from one data provider.

Receiver 412 may check for time ticks as receiver 412 receives data points 416. If a data point that has been received is actually a time tick, the time tick is immediately sent to any active policy request handlers that are receiving data points 416 from receiver 412. Time ticks may be used by policy request handlers to determine whether a data point was acquired within a specific time interval. Time ticks may be considered data points for a time parameter.

If the data point is not a time tick but is a true data point, receiver 412 determines whether the data point is for a parameter for which an active policy request handler is requesting data. If the data point is for a parameter for which an active policy request handler is requesting data, receiver 412 sends the data point to the policy request handler.

When storage system 414 is selected as the source for input data points 421, policy request handler 420 may retrieve some or all of stored data points 418 stored in storage system 414. For example, policy request handler 420 may retrieve the portion of stored data points 418 that includes all data points for both a first parameter and a second parameter generated within a selected time period.

In response to receiving input data points 421, policy request handler 420 processes input data points 421 and forms output data 422 to send to first client 326. Output data 422 may be formed in a manner similar to output data 156 in FIG. 1.

Input data points 421 may be received asynchronously at policy request handler 420 in a plurality of data streams. Each data stream may comprise data points for a different parameter. For example, one data stream may comprise, for example, time ticks for a time parameter. A second data stream may comprise data points for a particular parameter. A third data stream may comprise data points for a different parameter. Each data stream received at policy request handler 420 may be ordered with respect to time within that data stream in this illustrative example. However, different data streams may be received at different data rates. Thus, input data points 421 may be received asynchronously.

Policy request handler 420 may process each data stream and merge the data points from the different data streams into a single array of data points that are ordered with respect to time. This array may then be used to form output data 422. The process by which policy request handler 420 may form output data 422 using input data points 421 is described in greater detail in FIG. 8 below.

Figure 5:
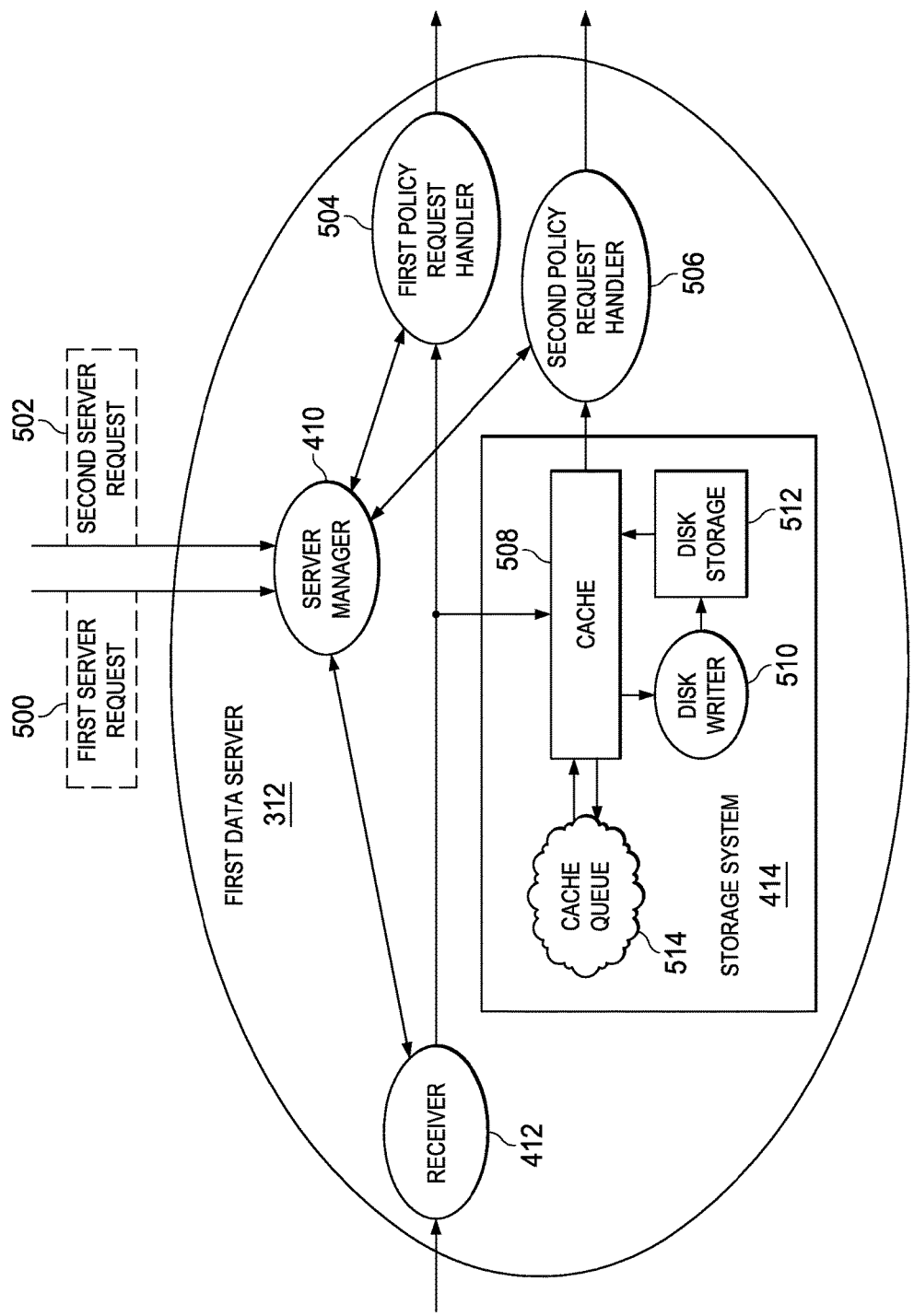
FIG. 5 is a more detailed illustration of a data server in accordance with an illustrative embodiment.

Turning now to FIG. 5, a more detailed illustration of first data server 312 from FIG. 4 is depicted in accordance with an illustrative embodiment. As depicted, server manager 410 may receive first server request 500 and second server request 502 concurrently. In one illustrative example, first server request 500 and second server request 502 may originate from a policy request sent by a same client. In another illustrative example, first server request 500 may originate from one client, while second server request 502 may originate from another client.

First server request 500 may be a live request. Second server request 502 may be a historical request. Server manager 410 activates first policy request handler 504 to handle first server request 500 and second policy request handler 506 to handle second server request 502. Server manager 410 controls receiver 412 and first policy request handler 504 such that first policy request handler 504 receives input data points from receiver 412. Further, server manager 410 controls second policy request handler 506 such that second policy request handler 506 receives input data points from storage system 414.

In this illustrative example, storage system 414 includes cache 508, disk writer 510, disk storage 512, and cache queue 514. When storage system 414 receives current data from receiver 412, the current data is first stored in cache 508. Once cache 508 has been filled and/or after some specified period of time has elapsed, disk writer 510 may begin writing the contents of cache 508 to disk storage 512. In this manner, all of the current data sent from receiver 412 may pass through cache 508, but may eventually be stored in disk storage 512. Both the data stored in cache 508 and the data stored in disk storage 512 may be referred to as past data.

Disk storage 512 may be comprised of any number of data storage devices such as, for example, but not limited to, a hard disk drive, an optical disk drive, or some other type of storage device. Depending on the implementation, disk storage 512 may permanently store data and/or may temporarily store data. The data stored in disk storage 512 may be written back into cache 508 when needed.

When activated, second policy request handler 506 may access cache 508 to determine whether the server data requested by second server request 502 is located in cache 508. If the desired data is indeed located in cache 508, second policy request handler 506 may retrieve this data as input data. However, if the desired data is not located in cache 508, second policy request handler 506 may send a message indicating as such to server manager 410. Server manager 410 may then send a command to storage system 414 to have past data stored in disk storage 512 written back to cache 508. Once this data has been written back to cache 508, second policy request handler 506 may then be able to retrieve this data.

In this illustrative example, cache queue 514 may be used to determine which elements of cache 508 are empty such that past data can be read from disk storage 512 to cache 508. When cache 508 is full and past data needs to be written from disk storage 512 to cache 508, cache queue 514 may be used to determine which elements of cache 508 are storing the oldest data such that this oldest data may be overwritten. Further, cache queue 514 may be used in determining which elements of cache 508 are available for storing the current data received from receiver 412.

Figure 6:
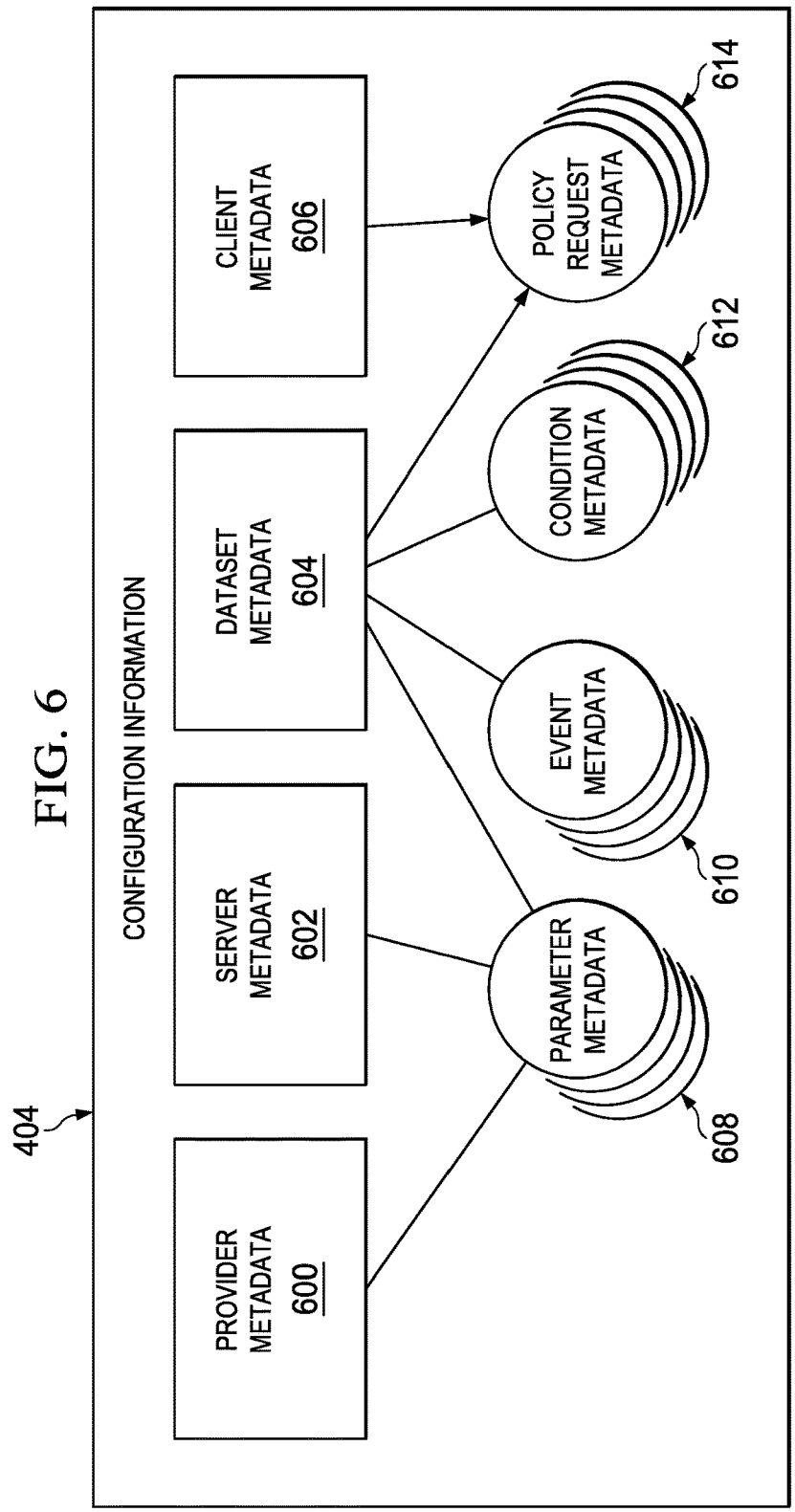
FIG. 6 is an illustration of configuration information in accordance with an illustrative embodiment.

With reference now to FIG. 6, an illustration of configuration information is depicted in accordance with an illustrative embodiment. In FIG. 6, an example of one implementation for configuration information 404 from FIG. 4 is depicted. Configuration information 404 may include various types of metadata. In some cases, the metadata included within configuration information 404 may be queried by one or more of set of clients 306 in FIG. 3 through controller manager 402.

In this illustrative example, configuration information 404 may include provider metadata 600, server metadata 602, dataset metadata 604, and client metadata 606. In this illustrative example, provider metadata 600 may be used to keep track of data providers, the data provided by the data providers, and the data servers to which data is sent from the data providers. For example, provider metadata 600 may be used by controller manager 402 in FIG. 4 to keep track of set of data providers 304 in FIG. 3.

Provider metadata 600 may be associated with parameter metadata 608. Parameter metadata 608 may identify the different parameters for which data is being hosted in server system 302 in FIG. 3. Provider metadata 600 and parameter metadata 608 may be used to keep track of the different types of parameters for which each of set of data providers 304 provides data.

Server metadata 602 may be used to keep track of data servers and the data hosted on each of these data servers. For example, server metadata 602 may be used by controller manager 402 in FIG. 4 to keep track of set of data servers 310 in FIG. 3. Server metadata 602, provider metadata 600, and parameter metadata 608 may be used to keep track of the different types of parameters for which data is received at each of set of data servers 310 from the different data providers in set of data providers 304.

In this illustrative example, dataset metadata 604 may be used to keep track of datasets. As used herein, a "dataset" may be a logical block of data for which time is monotonically increasing. A dataset may cover any block of time. For example, a dataset may include all data that was acquired over a selected period of time. As one specific example, a dataset may represent all data that was acquired by set of data providers 304 during a test run of the operation of an aircraft over the course of a day.

Within each dataset, the data points collected over time may be considered monotonically-increasing time order per parameter. In other words, as a particular data server receives the data points for a particular data set, all of the data points for each parameter may be ordered with respect to time, with the earliest acquired data points being received at the data server first.

At any given point in time, at most only one dataset may be active. An active dataset may be a dataset for which live data is available and for which live data is being currently received at set of data servers 310. In this illustrative example, only one active dataset may be present at any given point in time. However, in other illustrative examples, multiple active datasets may be present.

Dataset metadata 604 may keep track of each dataset for which data is received by set of data servers 310 in FIG. 3. Dataset metadata 604 may be associated with parameter metadata 608 and both may be used to track the parameters for which data is collected in each dataset. Further, dataset metadata 604 may also be associated with event metadata 610, condition metadata 612, and policy request metadata 614. Event metadata 610 and condition metadata 612 may represent additional notes that may be associated with datasets.

Further, dataset metadata 604 and policy request metadata 614 may be used to track the particular dataset from which data is requested by a policy request. In this illustrative example, each policy request from a client may only request data within a single dataset.

Client metadata 606 may be used to keep track of clients. For example, client metadata 606 may be used to keep track of set of clients 306 in FIG. 3. Client metadata 606 may be associated with policy request metadata 614. Client metadata 606 and policy request metadata 614 may be used to keep track of the policy requests made by each client.

In this manner, configuration information 404 may be used by controller manager 402 in server controller 308 in FIG. 4 to manage set of data providers 304, set of data servers 310, and set of clients 306. Of course, in other illustrative examples, other types of metadata may be included within configuration database 405 in addition to and/or in place of the ones described above.

Figure 7:
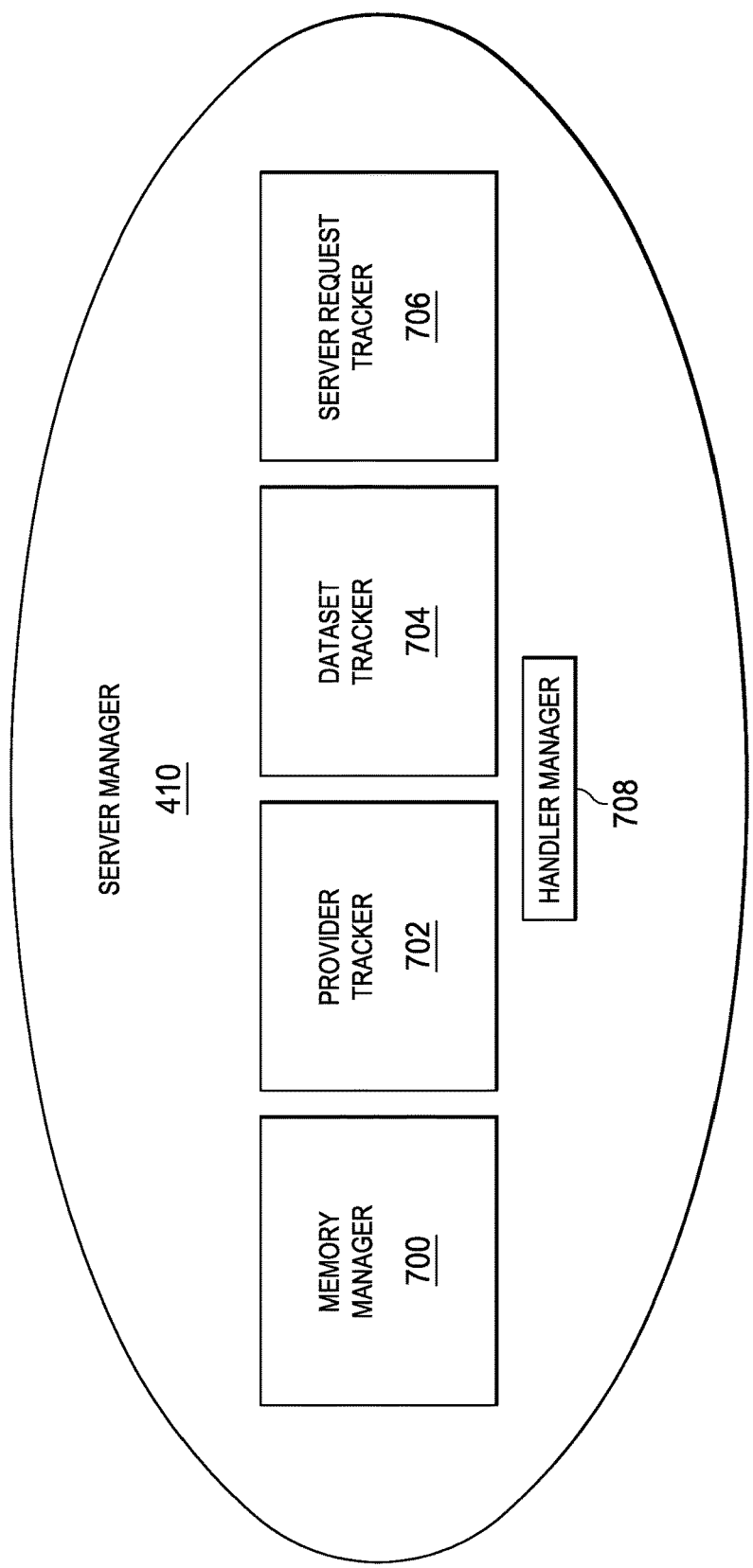
FIG. 7 is an illustration of a server manager in a data server in accordance with an illustrative embodiment.

With reference now to FIG. 7, an illustration of server manager 410 in first data server 312 from FIG. 4 is depicted in accordance with an illustrative embodiment. In this illustrative example, server manager 410 may include memory manager 700, provider tracker 702, dataset tracker 704, server request tracker 706, and handler manager 708.

In this illustrative example, memory manager 700 may be configured to manage the shared memory within first data server 312. For example, storage system 414 in FIG. 4 may include a portion of memory that may be shared with server manager 410. Memory manager 700 manages this shared memory. Further, memory manager 700 may be configured to manage any cache memory in first data server 312. For example, memory manager 700 may manage cache 508 in FIG. 5.

Provider tracker 702 may keep track of the one or more data providers in set of data providers 304 in FIG. 3 from which first data server 312 is receiving data. Dataset tracker 704 may keep track of the datasets for which data is received at first data server 312. Server request tracker 706 may keep track of the server requests received at first data server 312. Further, handler manager 708 may keep track of the policy request handlers active at any given time within first data server 312.

In this manner, server manager 410 may be able to effectively manage receiver 412, storage system 414, and any policy request handlers that are active within first data server 312 as seen in FIG. 4 and FIG. 5. Further, server manager 410 may be able to keep track of policy request information, including server requests, received from server controller 308 in FIG. 3.

Figure 8:
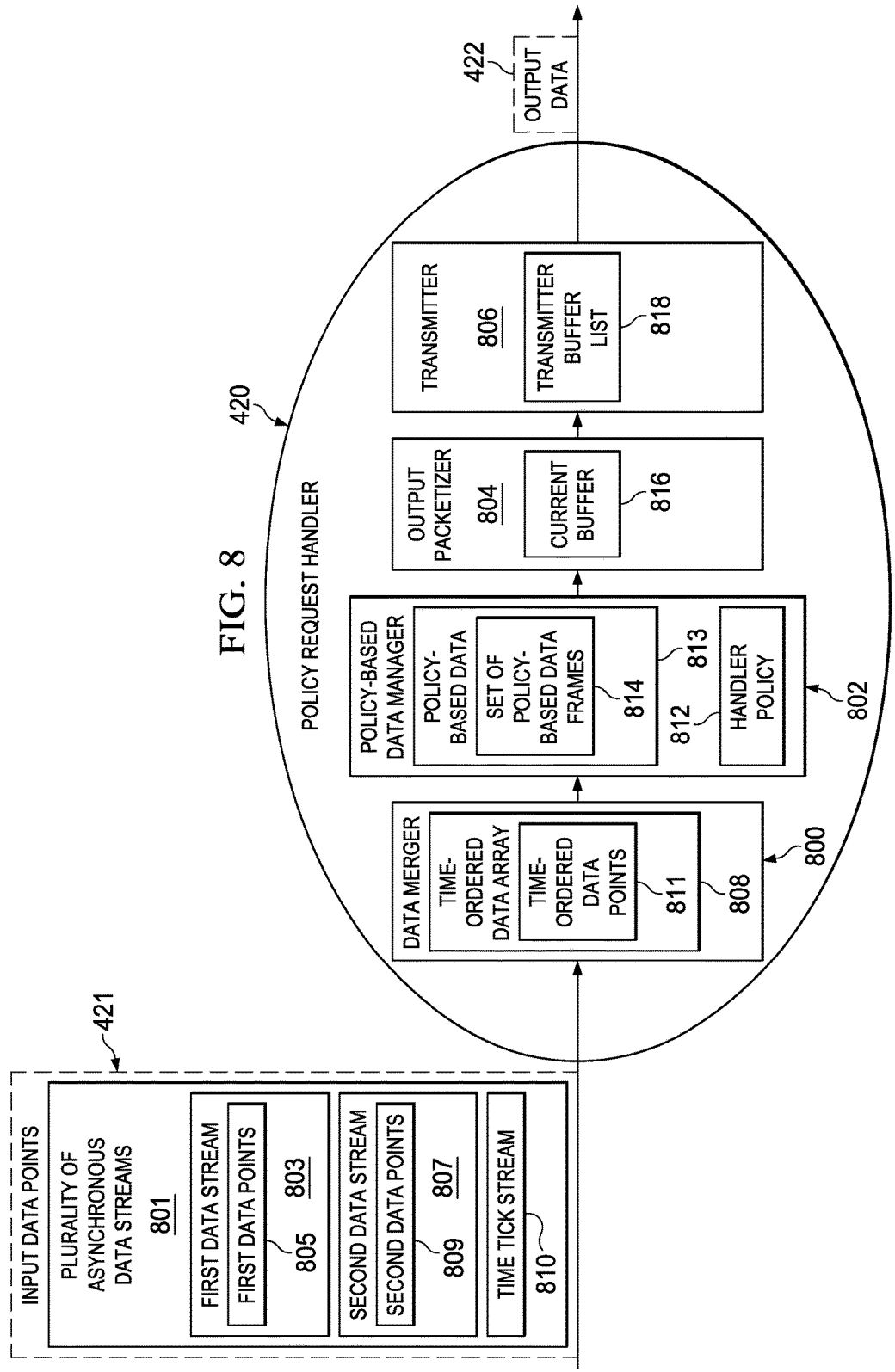
FIG. 8 is an illustration of a policy request handler in accordance with an illustrative embodiment.

With reference now to FIG. 8, an illustration of policy request handler 420 from FIG. 4 is depicted in accordance with an illustrative embodiment. In this illustrative example, policy request handler 420 includes data merger 800, policy-based data manager 802, output packetizer 804, and transmitter 806.

Data merger 800 may be configured to receive input data points 421 from FIG. 4 in plurality of asynchronous data streams 801. Plurality of asynchronous data streams 801 may include data streams having different rates. For example, a data stream in plurality of asynchronous data streams 801 may be received at a different data rate than another data stream in plurality of asynchronous data streams 801.

In one illustrative example, plurality of asynchronous data streams 801 includes first data stream 803 comprising first data points 805 for a first parameter and second data stream 807 comprising second data points 809 for a second parameter. Additionally, plurality of asynchronous data streams 801 may also include time tick stream 810. Time tick stream 810 may be a data stream of time ticks.

First data points 805 may be in monotonically increasing time order within first data stream 803. Second data points 809 may be in monotonically increasing time order within second data stream 807.

Data merger 800 may be configured to merge first data points 805 with second data points 809 to form time-ordered data array 808 comprising time-ordered data points 811. Time-ordered data points 811 may be in monotonically increasing time order. In particular, time-ordered data array 808 may be formed by adding first data points 805 and second data points 809 to time-ordered data array 808 in increasing time order based on the time value for each data point.

Data merger 800 sends time-ordered data points 811 in time-ordered data array 808 to policy-based data manager 802 for processing. Policy-based data manager 802 may be configured to use handler policy 812 to process time-ordered data points 811. Handler policy 812 may be received from server manager 410 in FIG. 4. Handler policy 812 may include the portion of the server policy in server request 408 from FIG. 4 to be used by policy request handler 420. Handler policy 812 may be implemented in a manner similar to policy 118 described in FIG. 2.

Policy-based data manager 802 uses handler policy 812 and time-ordered data points 811 to form policy-based data 813. Policy-based data 813 may then be sent to output packetizer 804.

When handler policy 812 indicates that server request 408 is an every sample request, policy-based data manager 802 may simply send each data point in time-ordered data points 811 to output packetizer 804. Each time-ordered data point in time-ordered data points 811 sent to output packetizer 804 retains the original time value associated with that data point that indicates the time at which the data point was acquired.

However, when handler policy 812 indicates that server request 408 is a framed request, policy-based data manager 802 may use time-ordered data points 811 to form set of policy-based data frames 814. For example, the handler policy 812 may indicate that the client wants to receive a data frame about every 1 second.

At the lapse of about every 1 second interval, policy-based data manager 802 may identify the data value for the data point for the first parameter that substantially coincides with the lapse of the time interval and the data point for the second parameter that substantially coincides with the lapse of the time interval. The data values for these data points may then be extracted and used to form a data frame comprising these data values and a frame time value. The frame time value assigned to this data frame may be the time at which the 1 second interval lapses or the actual time value for either the data point selected for the first parameter or the data point selected for the second parameter. In some cases, each of the data values may be associated with the actual time value for the data value in addition to all of the data frames being associated with the frame time value.

In some cases, when a data point does not exactly coincide with the time at which a time interval lapses, policy-based data manager 802 may use interpolation techniques to identify the data values for the first parameter and the second parameter. These techniques may include, for example, without limitation, deriving a new data value based on N data values before and after the time at which the time interval lapsed. Depending on the implementation, the type of interpolation that is used may be specified by handler policy 812.

In other illustrative examples, policy-based data manager 802 identifies the last known data value for the first parameter and the last known data value for the second parameter at that time. The last known data value for the first parameter may be the data value of the first data point from first data stream 803 having a time value prior to and closest to the time at which the interval lapses compared to the other data points in first data stream 803. Similarly, the last known data value for the second parameter may be the data value of the second data point from second data stream 807 having a time value prior to and closest to the time at which the interval lapses compared to the other data points in second data stream 807.

As policy-based data 813 is formed, policy-based data 813 may be sent to output packetizer 804 for further processing. Output packetizer 804 may buffer policy-based data 813 using one or more buffers of fixed size. As one illustrative example, output packetizer 804 may buffer policy-based data 813 using current buffer 816.

When current buffer 816 is full or when some predetermined amount of latency time has elapsed, current buffer 816 may be sent to transmitter 806 to await transmission and may become part of transmitter buffer list 818. Transmitter 806 may keep track of current buffers awaiting transmission using transmitter buffer list 818. Transmitter 806 sends the contents of current buffers awaiting transmission out to first client 326 from FIG. 3 and FIG. 4 in the form of output data 422.

Figure 9:
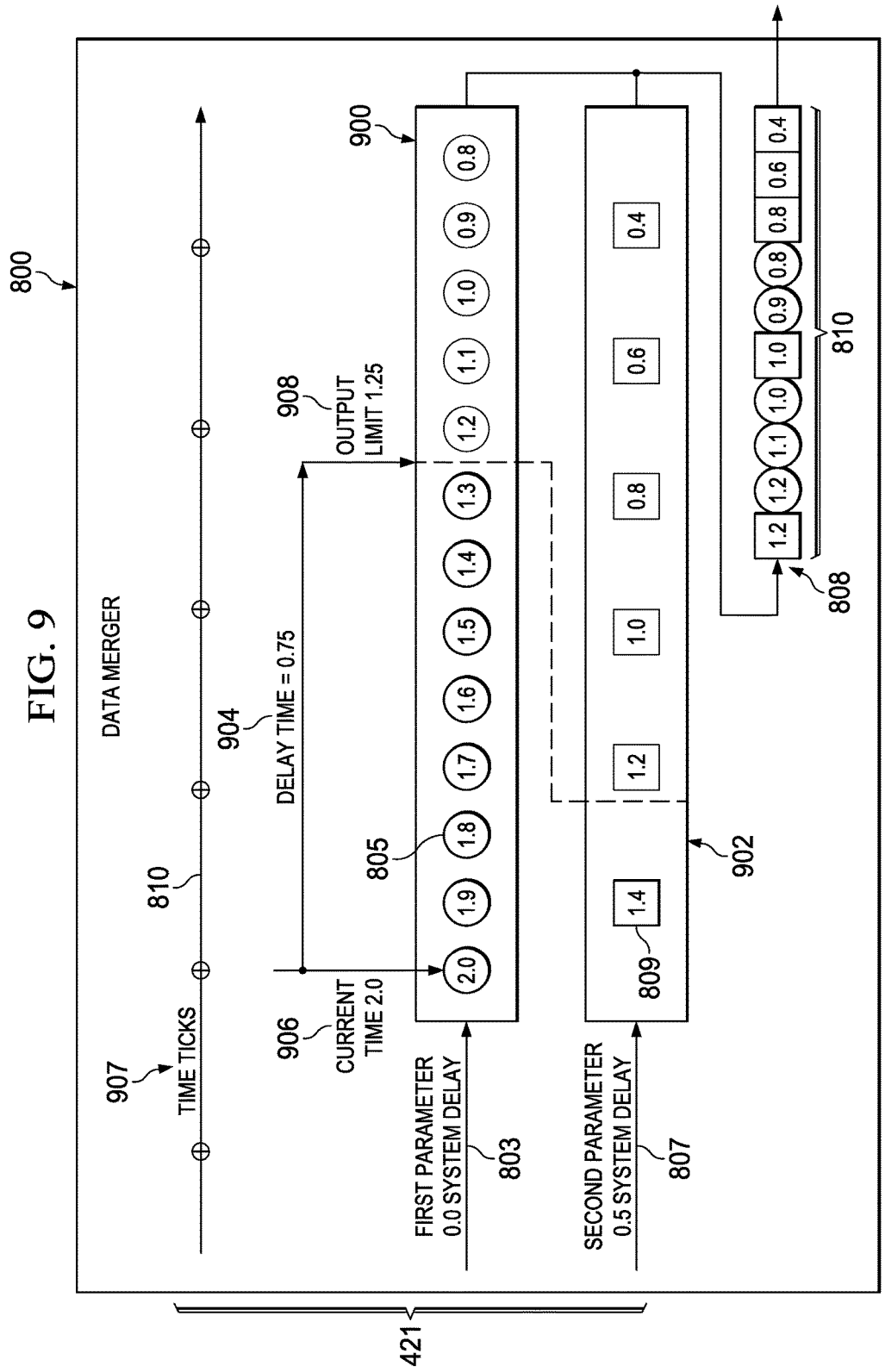
FIG. 9 is an illustration of a data merger in accordance with an illustrative embodiment.

With reference now to FIG. 9, an illustration of data merger 800 from FIG. 8 is depicted in accordance with an illustrative embodiment. In FIG. 9, an example of one manner in which input data points 421 may be merged together with respect to time by data merger 800 from FIG. 8 is depicted.

As depicted, input data points 421 may be received in first data stream 803 and second data stream 807. First data points 805 in first data stream 803 may be placed in first queue 900, while second data points 809 in second data stream 807 may be placed in second queue 902.

In this illustrative example, first data points 805 may be received with no system delay. However, second data points 809 may be received with a system delay of about 0.5 seconds. In other words, the time value for each of second data points 809 may be delayed by about 0.5 seconds from the actual time at which the data value for the data point was acquired. This system delay may also be referred to as a filter delay.

Because this system delay is known, data merger 800 takes this delay into account during the merging of first data stream 803 and second data stream 807. Data merger 800 may hold first data points 805 in first queue 900 for queue delay time 904 of about 0.75 seconds to allow for second data points 809 to arrive within second queue 902.

Current time 906 may be the current time known based on time ticks 907 received in time tick stream 810. Current time 906 minus queue delay time 904 results in output limit time 908 of about 1.25 seconds. In this illustrative example, any data points stored in first queue 900 and second queue 902 that were acquired earlier than output limit time 908 are added to time-ordered data array 808 as time-ordered data points 811. Time-ordered data points 811 may then be sent for processing to policy-based data manager 802 in FIG. 8.

Any data points stored in first queue 900 and second queue 902 that were acquired later than output limit time 908 are held in first queue 900 and second queue 902. As time progresses, output limit time 908 changes accordingly based on the changing current time 906 such that data points are continuously merged to form time-ordered data points and be sent out for processing.

In cases where a system delay or filter delay is not present for the data points for a particular parameter, queue delay time 904 may not be needed. Rather, a maximum latency time may be used. This maximum latency time may be selected by the client or policy request handler 420 seen in FIG. 4, or may be predetermined.

In other illustrative examples, data merger 800 may be configured to adjust the time values for data points associated with system delays. For example, data merger 800 may be configured to adjust the time values for second data points 809 as second data points 809 are added to second queue 902. In particular, each time value may be reduced by about 0.5 seconds to adjust for the system delay. In this manner, queue delay time 904 may not need to be used.

Additionally, the amount of space and/or size of time-ordered data array 808 may be reconfigurable. In particular, the amount of space and/or size of time-ordered data array 808 may be dynamically changed to accommodate different types of system delays.

Figure 10:
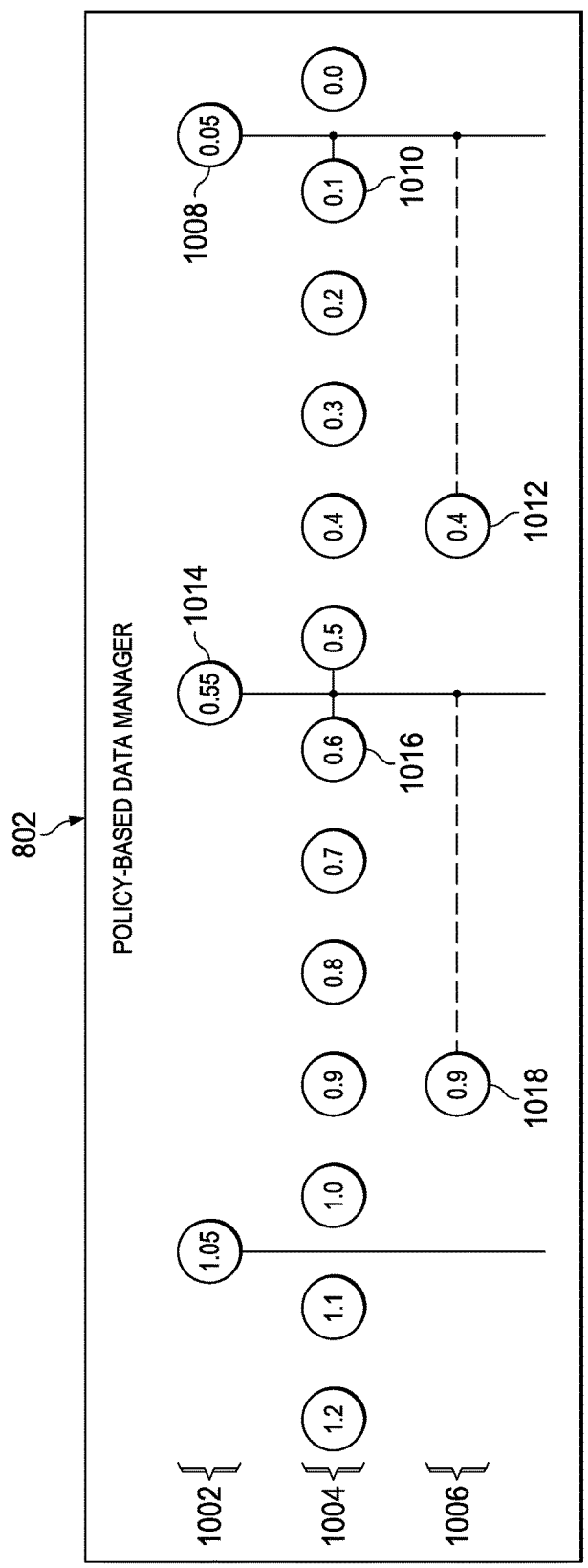
FIG. 10 is an illustration of a policy-based data manager in accordance with an illustrative embodiment.

With reference now to FIG. 10, an illustration of policy-based data manager 802 from FIG. 8 is depicted in accordance with an illustrative embodiment. Policy-based data manager 802 is configured to receive time-ordered data points 811 and process time-ordered data points 811 to form policy-based data 813 in FIG. 8. In this illustrative example, an example of a manner in which policy-based data 813 may be interpolated is depicted.

Interval times 1002 indicate the times at which a 0.5 second interval lapses and at which a data frame is to be formed. First data points 1004 are time-ordered points for a first parameter. Second data points 1006 are time-ordered data points for a second parameter.

As depicted, no data points coincide exactly with interval time 1008. Consequently, policy-based data manager 802 may use interpolation to identify the data values to be used for forming the data frame for interval time 1008. In this illustrative example, the data value for data point 1010 and the data value for data point 1012 are identified for use in forming the data frame. Data point 1010 is the data point within first data points 1004 having the next oldest time value after interval time 1008. Data point 1012 is the data point within second data points 1006 having the next oldest time value after interval time 1008.

Similarly, for the data frame to be formed for interval time 1014, the data value for data point 1016 and the data value for data point 1018 are identified for use in forming the data frame. Data point 1016 is the data point within first data points 1004 having the next oldest time value after interval time 1014. Data point 1018 is the data point within second data points 1006 having the next oldest time value after interval time 1014.

Although in FIGS. 8-10 described above, data merger 800 is described as forming time-ordered data array 808 with time-ordered data points 811 that are then processed by policy-based data manager 802, other types of arrays may be formed in other implementations. In other illustrative examples, first data points 805 may be merged with second data points 809 according to some other factor other than time. For example, first data points 805 may be merged with second data points 809 to form a data-ordered array. A data-ordered array may be an array of data points ordered with respect to the data values for the data points. The data points may be ordered in increasing order, decreasing order, sorted based on type of data value, or ordered and/or sorted in some other manner.

In still other illustrative examples, policy-based data manager 802 may be configured to use other techniques in addition to and/or in place of interpolation to form policy-based data 813. For example, policy-based data manager 802 may use at least one of an extrapolation technique, a curve-fitting technique, an equation-fitting technique, a filtering technique, a predictive technique, a data filling technique, a fast Fourier transform (FFT) technique, a zero phase real-time filtering (SPF) technique, or some other type of technique or algorithm to form policy-based data 813 using the data points provided by data merger 800.

Figure 11:
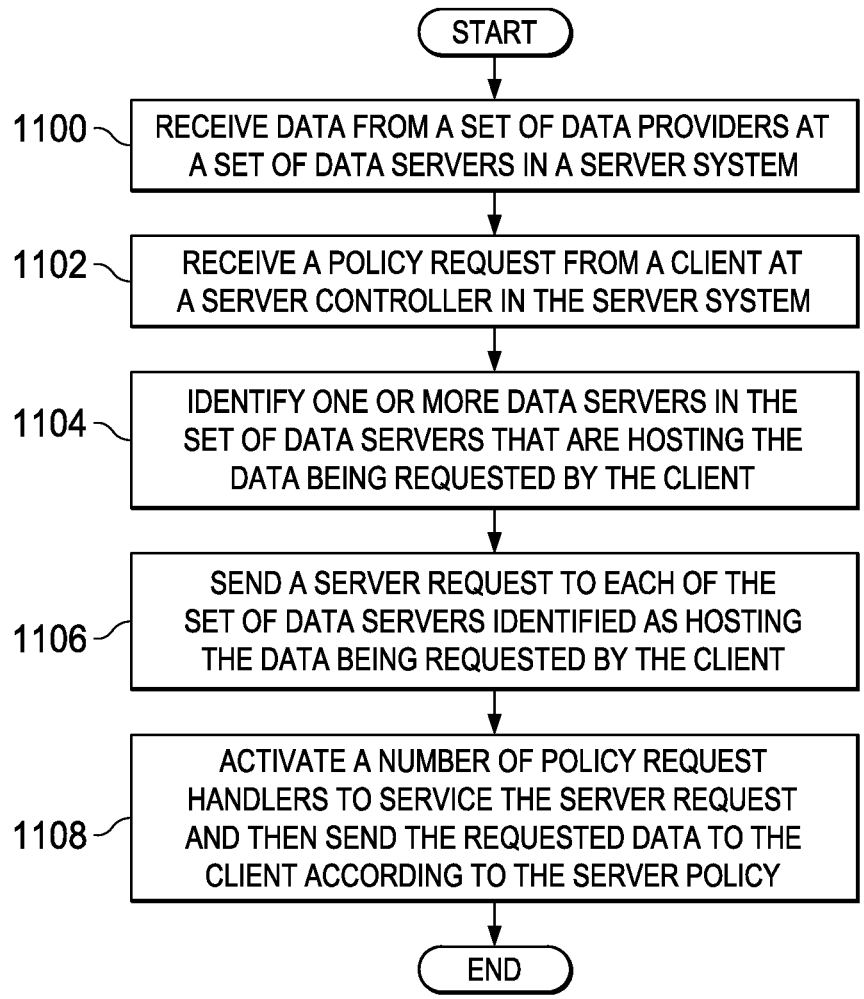
FIG. 11 is an illustration of a process for serving data to a client in the form of a flowchart in accordance with an illustrative embodiment.

With reference now to FIG. 11, an illustration of a process for serving data to a client is depicted in the form of a flowchart in accordance with an illustrative embodiment. The process illustrated in FIG. 11 may be implemented using server system 103 in FIG. 1.

The process begins by receiving data from a set of data providers at a set of data servers in a server system (operation 1100). Next, a policy request from a client is received at a server controller in the server system (operation 1102). In operation 1102, the policy request is a request for data according to a policy.

The server controller identifies one or more data servers in the set of data servers that are hosting the data being requested by the client (operation 1104). The server controller sends a server request to each of the set of data servers identified as hosting the data being requested by the client (operation 1106). In operation 1106, the server request is a request for data according to a server policy. The server policy includes the portion of the policy in the policy request to be used by the server in servicing the policy request.

In response to receiving a server request, each data server in the set of data servers activates a number of policy request handlers to service the server request and then sends the requested data to the client according to the server policy (operation 1108), with the process terminating thereafter.

Figure 12:
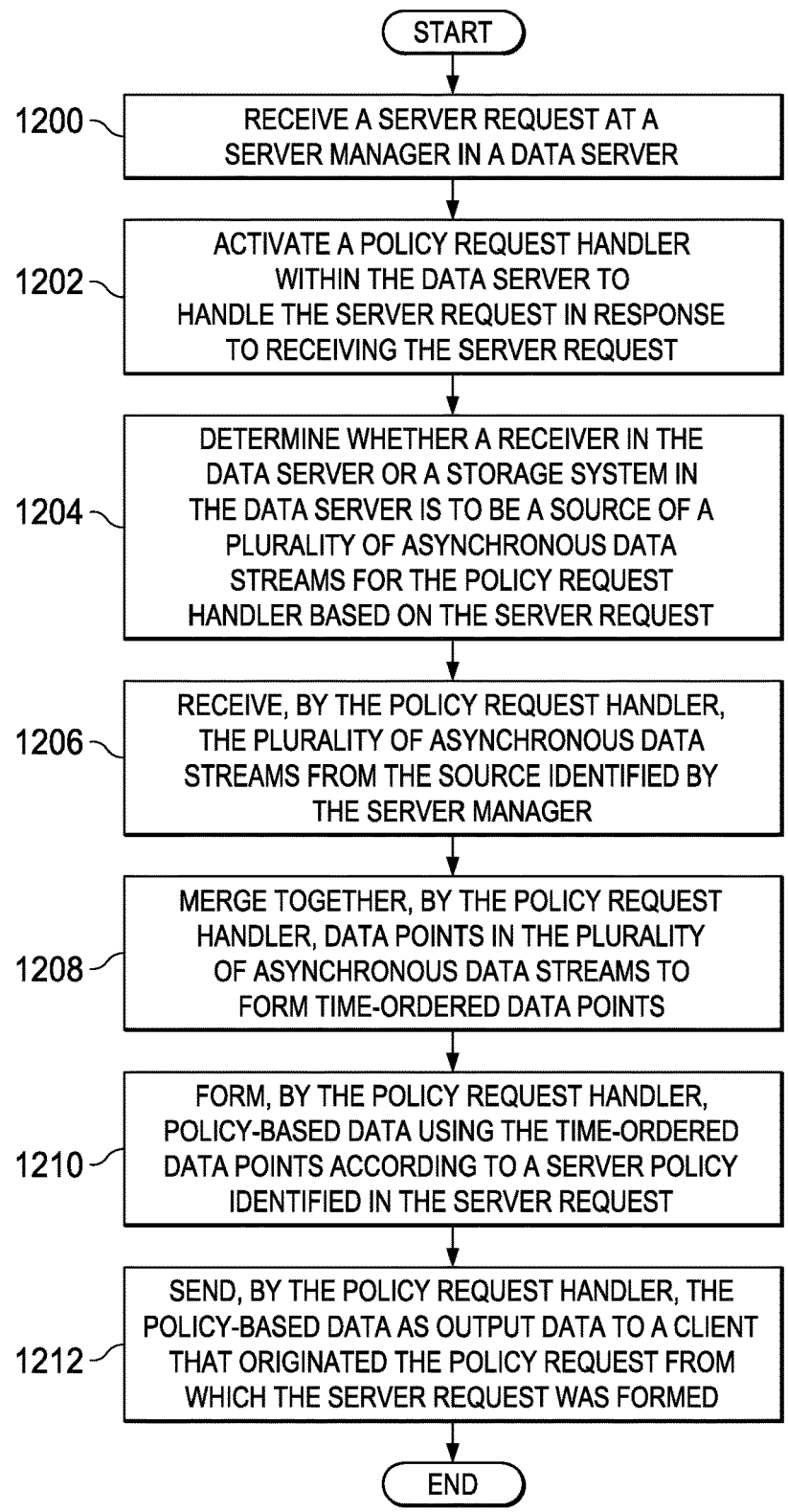
FIG. 12 is an illustration of a process for handling a server request in the form of a flowchart in accordance with an illustrative embodiment.

With reference now to FIG. 12, an illustration of a process for handling a server request is depicted in the form of a flowchart in accordance with an illustrative embodiment. The process described in FIG. 12 may be implemented by a data server, such as data server 124 in FIG. 1. Further, this process may be used in implementing operation 1108 in FIG. 11.

The process begins by receiving a server request at a server manager in the data server (operation 1200). The server request may have originated from a policy request sent by a client. The server manager activates a policy request handler within the data server to handle the server request in response to receiving the server request (operation 1202). The server manager determines whether a receiver in the data server or a storage system in the data server is to be a source of a plurality of asynchronous data streams for the policy request handler based on the server request (operation 1204).

In operation 1204, the receiver is selected as the source when the server request is a live request. The storage system is selected as the source when the request is a historical request.

The plurality of asynchronous data streams is received, by the policy request handler, from the source identified by the server manager (operation 1206). The plurality of asynchronous data streams may include at least two data streams that are received at the policy request handler at different data rates.

Next, data points in the plurality of asynchronous data streams are merged together, by the policy request handler, to form time-ordered data points (operation 1208). Thereafter, policy-based data is formed, by the policy request handler, using the time-ordered data points according to a server policy identified in the server request (operation 1210).

The policy-based data is then sent, by the policy request handler, as output data to the client that originated the policy request from which the server request was formed (operation 1212), with the process terminating thereafter. When the server request is a live request, operations 1206, 1208, 1210, and 1212 may be continuously formed until a request to stop sending data is received by the client.

Figure 13:
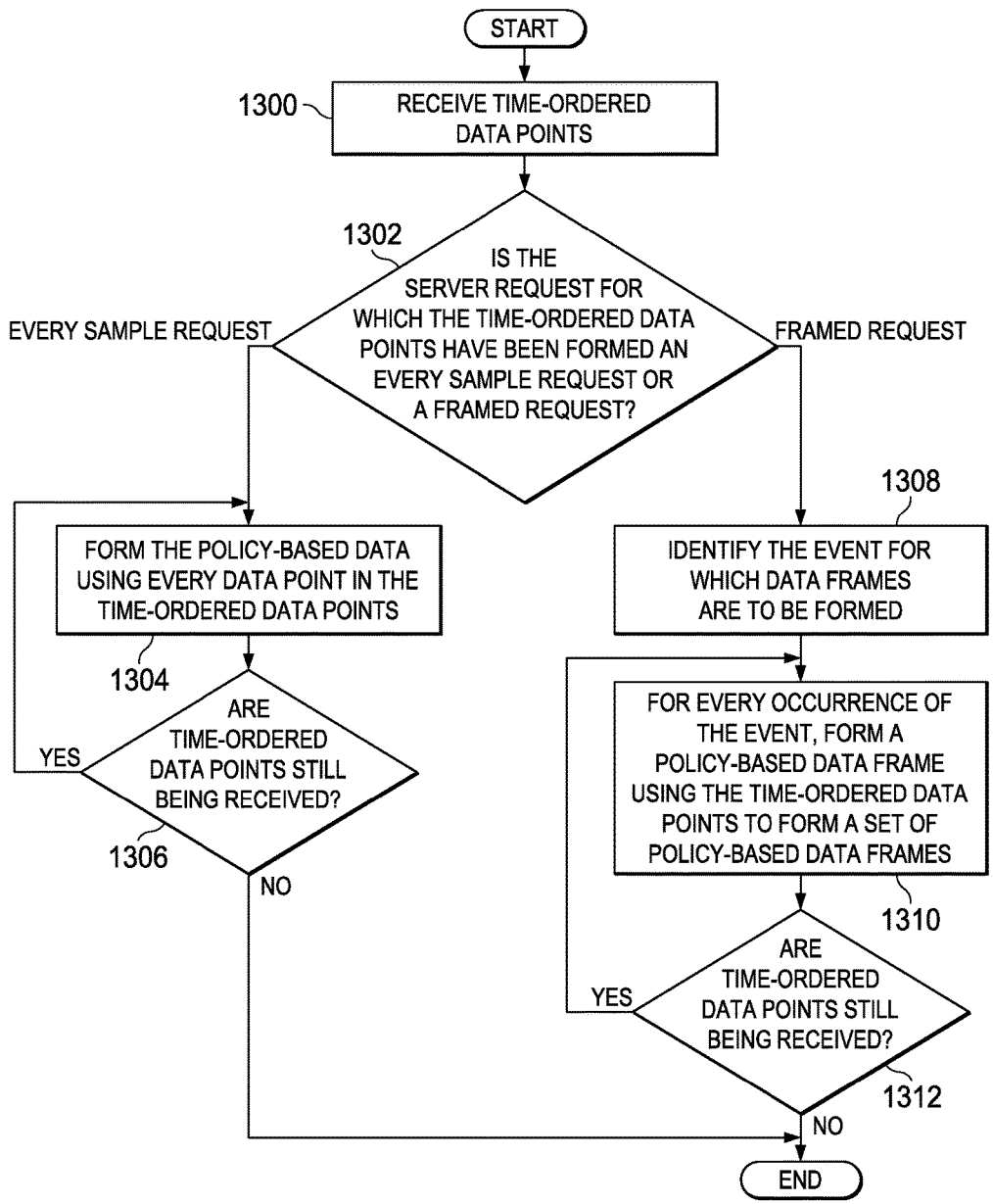
FIG. 13 is an illustration of a process for forming policy-based data in the form of a flowchart in accordance with an illustrative embodiment.

With reference now to FIG. 13, an illustration of a process for forming policy-based data is depicted in accordance with an illustrative embodiment. The process illustrated in FIG. 13 may be performed by a policy request handler, such as, for example, policy request handler 140 in FIG. 1. Further, this process may be used to implement operation 1210 in FIG. 12.

The process begins by receiving time-ordered data points (operation 1300). Next, a determination is made as to whether the server request for which the time-ordered data points have been formed is an every sample request or a framed request (operation 1302).

If the server request is an every sample request, the policy-based data is formed using every data point in the time-ordered data points (operation 1304). Each data point used to form the policy-based data retains the original time value associated with the data point. Next, a determination is made as to whether time-ordered data points are still being received (operation 1306). If time-ordered data points are still being received, the process returns to operation 1304 as described above. Otherwise, the process terminates.

With reference again to operation 1302, if the server request is a framed request, the event for which data frames are to be formed is identified (operation 1308). This event may also be referred to as a trigger. Thereafter, for every occurrence of the event, a policy-based data frame is formed using the time-ordered data points to form a set of policy-based data frames (operation 1310).

Next, a determination is made as to whether time-ordered data points are still being received (operation 1312). If time-ordered data points are still being received, the process returns to operation 1310 as described above. Otherwise, the process terminates.

Figure 14:
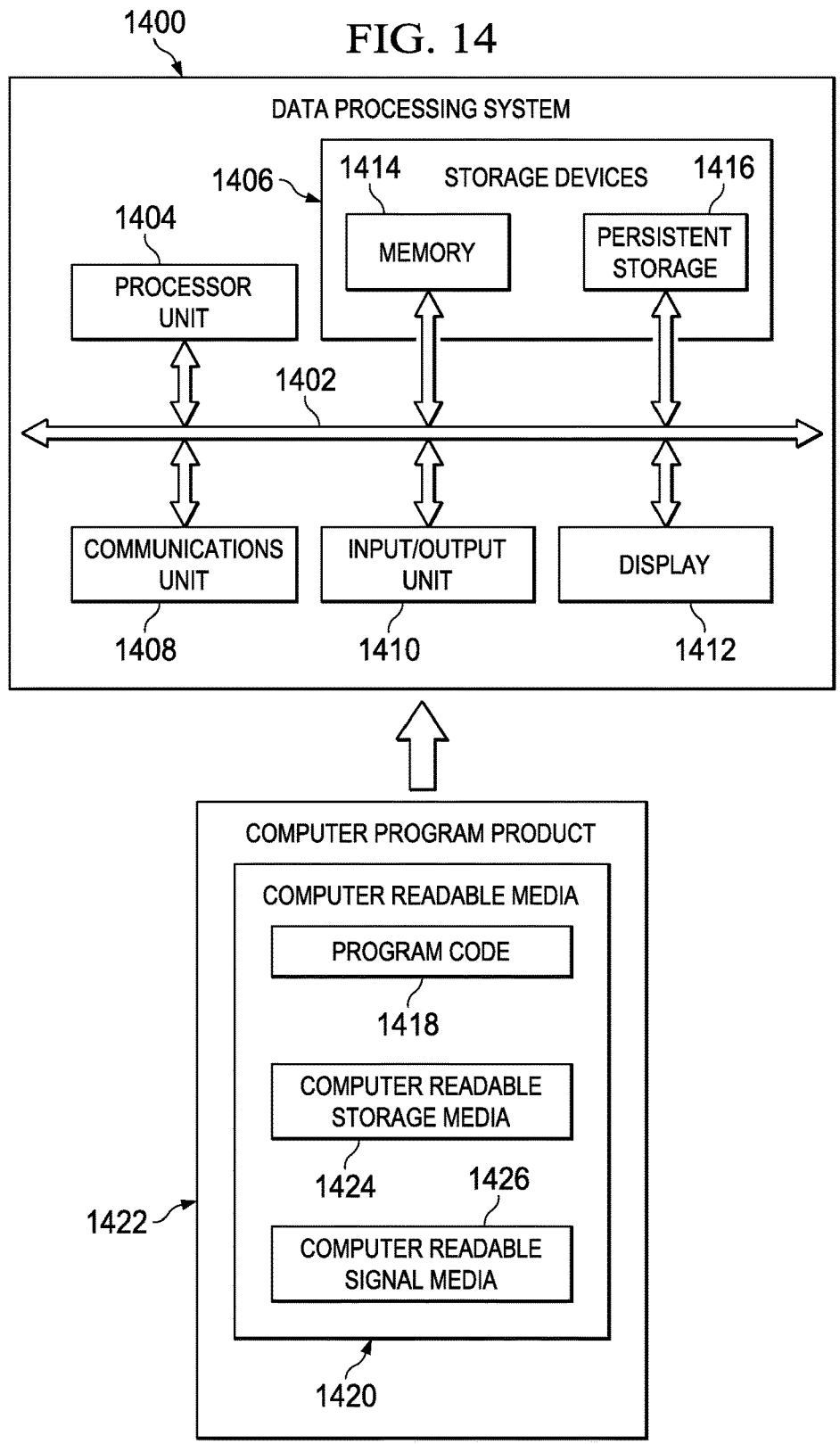
FIG. 14 is an illustration of a data processing system in the form of a block diagram in accordance with an illustrative embodiment.

Turning now to FIG. 14, an illustration of a data processing system in the form of a block diagram is depicted in accordance with an illustrative embodiment. Data processing system 1400 may be used to implement one or more of set of data providers 106, set of clients 104, set of data servers 110, and server controller 108 in FIG. 1. As depicted, data processing system 1400 includes communications framework 1402, which provides communications between processor unit 1404, storage devices 1406, communications unit 1408, input/output unit 1410, and display 1412. In some cases, communications framework 1402 may be implemented as a bus system.

Processor unit 1404 is configured to execute instructions for software to perform a number of operations. Processor unit 1404 may comprise a number of processors, a multi-processor core, and/or some other type of processor, depending on the implementation. In some cases, processor unit 1404 may take the form of a hardware unit, such as a circuit system, an application specific integrated circuit (ASIC), a programmable logic device, or some other suitable type of hardware unit.

Instructions for the operating system, applications, and/or programs run by processor unit 1404 may be located in storage devices 1406. Storage devices 1406 may be in communication with processor unit 1404 through communications framework 1402. As used herein, a storage device, also referred to as a computer readable storage device, is any piece of hardware capable of storing information on a temporary and/or permanent basis. This information may include, but is not limited to, data, program code, and/or other information.

Memory 1414 and persistent storage 1416 are examples of storage devices 1406. Memory 1414 may take the form of, for example, a random access memory or some type of volatile or non-volatile storage device. Persistent storage 1416 may comprise any number of components or devices.

For example, persistent storage 1416 may comprise a hard drive, a flash memory, a rewritable optical disk, a rewritable magnetic tape, or some combination of the above. The media used by persistent storage 1416 may or may not be removable.

Communications unit 1408 allows data processing system 1400 to communicate with other data processing systems and/or devices. Communications unit 1408 may provide communications using physical and/or wireless communications links.

Input/output unit 1410 allows input to be received from and output to be sent to other devices connected to data processing system 1400. For example, input/output unit 1410 may allow user input to be received through a keyboard, a mouse, and/or some other type of input device. As another example, input/output unit 1410 may allow output to be sent to a printer connected to data processing system 1400.

Display 1412 is configured to display information to a user. Display 1412 may comprise, for example, without limitation, a monitor, a touch screen, a laser display, a holographic display, a virtual display device, and/or some other type of display device.

In this illustrative example, the processes of the different illustrative embodiments may be performed by processor unit 1404 using computer-implemented instructions. These instructions may be referred to as program code, computer usable program code, or computer readable program code and may be read and executed by one or more processors in processor unit 1404.

In these examples, program code 1418 is located in a functional form on computer readable media 1420, which is selectively removable, and may be loaded onto or transferred to data processing system 1400 for execution by processor unit 1404. Program code 1418 and computer readable media 1420 together form computer program product 1422. In this illustrative example, computer readable media 1420 may be computer readable storage media 1424 or computer readable signal media 1426.

Computer readable storage media 1424 is a physical or tangible storage device used to store program code 1418 rather than a medium that propagates or transmits program code 1418. Computer readable storage media 1424 may be, for example, without limitation, an optical or magnetic disk or a persistent storage device that is connected to data processing system 1400.

Alternatively, program code 1418 may be transferred to data processing system 1400 using computer readable signal media 1426. Computer readable signal media 1426 may be, for example, a propagated data signal containing program code 1418. This data signal may be an electromagnetic signal, an optical signal, and/or some other type of signal that can be transmitted over physical and/or wireless communications links.

The illustration of data processing system 1400 in FIG. 14 is not meant to provide architectural limitations to the manner in which the illustrative embodiments may be implemented. The different illustrative embodiments may be implemented in a data processing system that includes components in addition to or in place of those illustrated for data processing system 1400. Further, components shown in FIG. 14 may be varied from the illustrative examples shown.

The flowcharts and block diagrams in the different depicted embodiments illustrate the architecture, functionality, and operation of some possible implementations of apparatuses and methods in an illustrative embodiment. In this regard, each block in the flowcharts or block diagrams may represent a module, a segment, a function, and/or a portion of an operation or step.

For example, one or more of the blocks may be implemented as program code, in hardware, or a combination of the program code and hardware. When implemented in hardware, the hardware may, for example, take the form of integrated circuits that are manufactured or configured to perform one or more operations in the flowcharts or block diagrams. When implemented as a combination of program code and hardware, the implementation may take the form of firmware.

In some alternative implementations of an illustrative embodiment, the function or functions noted in the blocks may occur out of the order noted in the figures. For example, in some cases, two blocks shown in succession may be executed substantially concurrently, or the blocks may sometimes be performed in the reverse order, depending upon the functionality involved. Also, other blocks may be added in addition to the illustrated blocks in a flowchart or block diagram.

The description of the different illustrative embodiments has been presented for purposes of illustration and description, and is not intended to be exhaustive or limited to the embodiments in the form disclosed. Many modifications and variations will be apparent to those of ordinary skill in the art. Further, different illustrative embodiments may provide different features as compared to other illustrative embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. A data server, comprising:
   a receiver configured to receive a plurality of asynchronous data streams from a data provider;
   a storage system configured to store the plurality of asynchronous data streams received by the receiver and sent by the receiver to the storage system; and
   program code residing on a non-transitory computer readable storage device, the program code comprising a policy request handler that is activated within the data server in response to a server request being received at the data server from a client, wherein the policy request handler is configured to:
   responsive to the server request being a first request for live data, receive input points comprising the plurality of asynchronous data streams received by the receiver before the plurality of asynchronous data streams are stored in the storage system;
   responsive to the server request being a second request for historical data, retrieving the input points from the storage system;
   merge data points in the input points together to form an array of time-ordered data points, wherein the data points comprise data values and time values, wherein the data values comprise parametric data from a sensor, and wherein the data points are merged into a monotonically increasing time order in the array of time-ordered data points from among all of the plurality of asynchronous data streams based on a corresponding time value for each corresponding data point in the plurality of asynchronous data streams;

responsive to forming the array of time-ordered data points, determine a result as to whether the server request is an every sample request or a framed request having a trigger;

generate policy-based data according to a server policy identified in the server request, wherein the policy-based data is generated from the array of time-ordered data points and the result; and send the policy-based data to the client in a manner requested by the client, wherein the policy-based data defines the manner in which the data points are delivered to the client.

2. The data server of claim 1, wherein the policy request handler comprises: a data merger that merges the data points in the plurality of asynchronous data streams together to form the array of time-ordered data points.

3. The data server of claim 2, wherein the data merger receives the plurality of asynchronous data streams from the receiver in the data server when the server request is the first request, in which the receiver receives first data from at least one of a set of data providers.

4. The data server of claim 3, wherein the data merger receives the plurality of asynchronous data streams from the storage system in the data server when the server request is the second request, in which the storage system stores the data received by the receiver.

5. The data server of claim 2, wherein the policy request handler further comprises: a policy-based data manager that forms the policy-based data using the array of time-ordered data points in which the policy-based data is formed based on the server policy.

6. The data server of claim 5, wherein the policy-based data manager is configured to use each of the data points in the array of time-ordered data points to generate the policy-based data for the server policy indicating that the server request is the every sample request.

7. The data server of claim 5, wherein the policy-based data manager is configured to form the policy-based data as a set of policy-based data frames in which each policy-based data frame in the set of policy-based data frames is formed in response to an event occurring using the array of time-ordered data points.

8. The data server of claim 7, wherein the event is a lapse of a time interval, and wherein one of the set of policy-based data frames in the set of policy-based data frames comprises a number of data values and an indication of time at which the lapse of the time interval occurred.

9. The data server of claim 8, wherein the number of data values are identified using the array of time-ordered data points and interpolation.

10. The data server of claim 1, wherein the policy request handler further comprises: an output packetizer that forms output data for transmission from the policy request handler to the client using the policy-based data.

11. The data server of claim 1, wherein the time values indicate a time at which the data values were acquired.

12. The data server of claim 1, wherein the policy request handler serves the policy-based data to the client that generated a policy request from which the server request was formed.

13. A server system, comprising:
program code residing on a non-transitory computer readable storage device, the program code comprising a server controller configured to receive a policy request from a client and generate a number of server requests based on the policy request; and a set of data servers, wherein a data server in the set of data servers comprises:
a first receiver configured to:
receive a plurality of asynchronous data streams from a data provider; and
send the plurality of asynchronous data streams to a storage system, wherein the storage system is configured to store the plurality of asynchronous data streams;
a server manager that activates a number of policy request handlers in response to receiving a server request in the number of server requests; and
a policy request handler in the number of policy request handlers that is configured to:
responsive to the server request being a first request for live data, receive input points comprising the plurality of asynchronous data streams received by the first receiver before the plurality of asynchronous data streams are stored in the storage system;
responsive to the server request being a second request for historical data, retrieving the input points from the storage system;
merge data points and the input points together to form an array of time-ordered data points, wherein the data points comprise data values and time values, wherein the data values comprise parametric data from a sensor, and wherein the data points are merged into a monotonically increasing time order in the array of time-ordered data points from among all of the plurality of asynchronous data streams based on a corresponding time value for each corresponding data point in the plurality of asynchronous data streams;
responsive to forming the array of time-ordered data points, determine a result as to whether the server request is an every sample request or a framed request having a trigger;
generate policy-based data according to a server policy identified in the server request, wherein the policy-based data is generated from the array of time-ordered data points and the result; and
send the policy-based data to the client in a manner requested by the client, wherein the policy-based data defines the manner in which the data points are delivered to the client.

14. A method comprising:
receiving a plurality of asynchronous data streams from a data provider by a receiver in a data server;
sending the plurality of asynchronous data streams received by the receiver to a storage system in the data server;
storing the plurality of asynchronous data streams sent from the receiver to the storage system in the storage system;
generating a server request using a policy-request generated by a client;
activating a policy request handler within the data server in response to receiving the server request;
responsive to the server request being a first request for live data, receiving input points comprising the plurality of asynchronous data streams received by the receiver before the plurality of asynchronous data streams are stored in the storage system at the policy request handler;

responsive to the server request being a second request for historical data, retrieving the input points from the storage system by the policy request handler;

merging, by the policy request handler, data points with the input points to form time-ordered data points, wherein the data points comprise data values and time values, and wherein the data values comprise parametric data from a sensor;

responsive to forming the time-ordered data points, determine a result as to whether the server request is an every sample request or a framed request having a trigger;

forming, by the policy request handler, policy-based data according to a server policy identified in the server request using the time-ordered data points and the result; and sending the policy-based data as output data to the client.

15. The method of claim 14, wherein receiving the input points at the policy request handler comprises: receiving the plurality of asynchronous data streams at the policy request handler from the receiver in the data server when the server request is the first request in which the receiver receives first data from at least one of a set of data providers.

16. The method of claim 15, wherein receiving the input points at the policy request handler further comprises: receiving the plurality of asynchronous data streams at the policy request handler from the storage system in the data server when the server request is the second request in which the storage system stores the data received by the receiver.

17. The method of claim 14, wherein forming, by the policy request handler, the policy-based data comprises: forming, by the policy request handler, the policy-based data as a set of policy-based data frames in which each policy-based data frame in the set of policy-based data frames is formed in response to an event occurring using the time-ordered data points.

18. The data server of claim 2, wherein:
the data points in the plurality of asynchronous data streams comprise a first data point having a first time value, and a second data point having a second time value;
the first data point and the first time value are generated earlier in time than the second data point and the second time value;
the policy request handler receives the second data point and the second time value before the first data point and the first time value; and
the data merger forms the array of time-ordered data points such that the first data point is arranged before the second data point.

19. The server system of claim 13, wherein:
each of the data points in the array of time-order data points is used to generate the policy-based data when the server policy indicates that the server request is the every sample request;
the policy-based data is used to produce a set of policy-based data frames in which each policy-based data frame in the set of policy-based data frames is produced in response to an event occurring using the array of time-ordered data points;
the event is a lapse of a time interval and wherein one of the policy-based data frames in the set of policy-based data frames comprises a number of data values and a first time value indicating a time at which the lapse of the time interval occurred; and
the number of data values is identified using the array of time-ordered data points and interpolation.

* * * * *